(12) United States Patent
Kim et al.

(10) Patent No.: US 10,405,207 B2
(45) Date of Patent: Sep. 3, 2019

(54) METHOD AND DEVICE FOR RECEIVING BROADCAST INFORMATION IN WIRELESS COMMUNICATION SYSTEM

(71) Applicant: Samsung Electronics Co., Ltd., Suwon-si, Gyeonggi-do (KR)

(72) Inventors: Donghan Kim, Osan-si (KR); Jinyoung Oh, Seoul (KR); Seung-Hoon Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/776,760

(22) PCT Filed: Nov. 14, 2016

(86) PCT No.: PCT/KR2016/013064
§ 371 (c)(1),
(2) Date: May 16, 2018

(87) PCT Pub. No.: WO2017/086662
PCT Pub. Date: May 26, 2017

(65) Prior Publication Data
US 2018/0343571 A1    Nov. 29, 2018

(30) Foreign Application Priority Data
Nov. 16, 2015    (KR) .......................... 10-2015-0160556

(51) Int. Cl.
*H04J 11/00*        (2006.01)
*H04L 27/26*        (2006.01)
(Continued)

(52) U.S. Cl.
CPC ............. *H04W 24/02* (2013.01); *H04J 11/00* (2013.01); *H04L 27/26* (2013.01); *H04W 16/24* (2013.01);
(Continued)

(58) Field of Classification Search
None
See application file for complete search history.

(56) References Cited

U.S. PATENT DOCUMENTS

| | | |
|---|---|---|
| 2014/0198663 A1 | 7/2014 | Xu et al. |
| 2015/0117410 A1* | 4/2015 | Wu ........................... H04L 1/08 370/331 |

(Continued)

FOREIGN PATENT DOCUMENTS

| | | |
|---|---|---|
| WO | 2015012654 A1 | 1/2015 |
| WO | 2015041487 A1 | 3/2015 |

(Continued)

OTHER PUBLICATIONS

ISA/KR, "International Search Report and Written Opinion of the International Searching Authority," International Application No. PCT/KR2016/013064, dated Feb. 16, 2017, 14 pages.

(Continued)

*Primary Examiner* — Brian S Roberts

(57) ABSTRACT

The present disclosure relates to a communication technique which combines a 5G (5th Generation) communication system, for supporting a higher data transmission rate following 4G (4th Generation) systems, with IoT (Internet of Things) technology, and to a system for the communication technique. The present disclosure may be applied to intelligent services (for example, smart home, smart building, smart city, smart car or connected car, health care, digital education, retail business, security, and safety-related services), based on 5G communication technology and IoT-related technology. The present invention relates to a method and device for receiving broadcast information by means of a terminal in a communication system. The method for receiving broadcast information by means of a terminal in a communication system according to an embodiment of the present invention comprises the processes of: receiving a (Continued)

signal including broadcast information from a base station; using a repeating pattern of the signal and determining a value for autocorrelation; determining whether coverage enhancement is supported by the base station on the basis of the value for the autocorrelation; acquiring the broadcast information through decoding of the signal when the base station supports coverage enhancement; and moving to another cell or another center frequency and implementing initial connection when the base station does not support coverage enhancement.

20 Claims, 13 Drawing Sheets

(51) Int. Cl.
  *H04W 24/02*  (2009.01)
  *H04W 16/24*  (2009.01)
  *H04W 48/12*  (2009.01)
  *H04W 24/08*  (2009.01)
  *H04W 4/70*  (2018.01)

(52) U.S. Cl.
  CPC .............. *H04W 48/12* (2013.01); *H04W 4/70* (2018.02); *H04W 24/08* (2013.01)

(56) References Cited

U.S. PATENT DOCUMENTS

2016/0227502 A1\* 8/2016 Vos ................... H04W 56/0015
2016/0353440 A1\* 12/2016 Lee ......................... H04W 4/70

FOREIGN PATENT DOCUMENTS

WO  2015057028 A1  4/2015
WO  2015143244 A1  9/2015

OTHER PUBLICATIONS

Huawei, et al., "Simple frequency hopping for MTC and coverage enhancement," R1-156935, 3GPP TSG RAN WG1 Meeting #83, Anaheim, USA, Nov. 15-22, 2015 5 pages.

ZTE, "Remaining issues on random access for MTC coverage enhancement," R1-156669, 3GPP TSG RAN WG1 Meeting#83, Anaheim, USA, Nov. 15-22, 2015, 6 pages.

European Patent Office, "Supplementary European Search Report," Application No. EP16866614.7, dated Oct. 25, 2018, 8 pages.

Qualcomm Incorporated, "PBCH Repetition for MTC," R1-153851, 3GPP TSG RAN WG1 #82, Beijing, China, Aug. 24-28, 2015, 3 pages.

\* cited by examiner

METHOD AND DEVICE FOR RECEIVING BROADCAST INFORMATION IN WIRELESS COMMUNICATION SYSTEM

CROSS-REFERENCE TO RELATED APPLICATIONS AND CLAIM OF PRIORITY

This application is a 371 National Stage of International Application No. PCT/KR2016/013064, filed Nov. 14, 2016, which claims priority to Korean Patent Application No. KR 10-2015-0160556, filed Nov. 16, 2015, the disclosures of which are herein incorporated by reference in their entirety.

BACKGROUND

1. Field

The present disclosure relates to a method and device in which a terminal receives broadcast information in a communication system.

2. Description of Related Art

In order to meet the increasing demand for wireless data traffic after the commercialization of 4th generation (4G) communication systems, efforts are being made to develop improved 5th generation (5G) communication systems or pre-5G communication systems. For this reason, the 5G communication system or the pre-5G communication system is called a beyond 4G network communication system or a post Long Term Evolution (LTE) system. In order to achieve a high data rate, the 5G communication system is being considered for implementation in very high frequency (mmWave) bands (e.g., 28 gigahertz (28 GHz) or 60 gigahertz (60 GHz) bands). In order to mitigate the path loss of radio waves in a very high frequency band and to increase the propagation distance of radio waves in the 5G communication system, beamforming, massive MIMO, full-dimensional MIMO (FD-MIMO), array antennas, analog beamforming, and large scale antenna technologies are being discussed. In addition, in order to improve the network of the system, in the 5G communication system, an evolved small cell, an advanced small cell, a cloud radio access network (cloud RAN), an ultra-dense network, Device to Device communication (D2D), a wireless backhaul, a moving network, cooperative communication, Coordinated Multi-Points (CoMP), and reception interference cancellation are being developed. In addition, in the 5G system, Hybrid Frequency Shift Keying and Quadrature Amplitude Modulation (FQAM) and Sliding Window Superposition Coding (SWSC) which are Advanced Coding Modulation (ACM) schemes, and Filter Bank Multi Carrier (FBMC), Non-Orthogonal Multiple Access (NOMA), and Sparse Code Multiple Access (SCMA) which are advanced connectivity technologies are being developed.

Meanwhile, the Internet has evolved from a human-centered connection network where humans generate and consume information to an Internet of Things (IoT) network in which information is exchanged between distributed components such as objects and processed. Internet of Everything (IoE) technology, which combines IoT technology with big data processing technology through connection with cloud servers, is also emerging. In order to implement IoT, technology elements such as sensing technology, wired/wireless communication, network infrastructure, service interface technology, and security technology are required. In recent years, technologies such as sensor network, Machine to Machine (M2M), Machine Type Communication (MTC), and the like have been studied for connection between objects. In the IoT environment, an intelligent Internet Technology (IT) service can be provided that collects and analyzes data generated from connected objects to create new value in human life. IoT can be applied to fields such as smart homes, smart buildings, smart cities, smart cars or connected cars, smart grids, health care, smart home appliances, advanced medical services, and the like through the convergence and combination of existing information technology (IT) technology and various industries.

Accordingly, various attempts have been made to apply the 5G communication system to the IoT network. For example, 5G communication technologies such as sensor network, M2M, MTC, and the like are implemented by techniques such as beamforming, MIMO, array antennas, and the like. The application of a cloud wireless access network as the big data processing technology described above is an example of the convergence of 5G technology and IoT technology.

The communication system is not limited to providing the initial voice-oriented service. For example, the communication system is evolving into a broadband communication system that provides high-speed and high-quality packet data services, such as communication standards such as high speed packet access (HSPA) of 3GPP, long term evolution (LTE) or evolved universal terrestrial radio access (E-UTRA), high rate packet data (HRPD) of 3GPP2, ultra mobile broadband (UMB), Institute of Electrical and Electronics Engineers (IEEE) 802.16e, and the like.

In such a communication system, a terminal receives broadcast information by performing synchronization and cell searching using an initial signal (i.e., a primary synchronization signal (PSS)) and a secondary synchronization signal (SSS) which are received from a base station, and then communicates with the base station. The broadcast information is information necessary for the terminal to perform initial connection with the base station and to communicate with the base station.

SUMMARY

An aspect of the present disclosure is to provide a device and method for a terminal to receive broadcast information in a communication system.

Another aspect of the present disclosure is to provide a device and method for a terminal to calculate autocorrelation with respect to a received signal in a communication system.

Another aspect of the present disclosure is to provide a device and method for determining whether a base station supports coverage extension of a broadcast signal for a terminal in a communication system.

Another aspect of the present disclosure is to provide a device and method for a terminal to perform offset estimation and compensation on a received signal on the basis of results of autocorrelation calculation in a communication system.

Another aspect of the present disclosure is to provide a device and method for receiving broadcast information in consideration of the number of times of decoding for a signal received in a communication system.

Another aspect of the present disclosure is to provide a device and method for detecting whether a base station supports coverage extension of a broadcast signal for a terminal in a communication system and receiving broadcast information therefrom.

Another aspect of the present disclosure is to provide a device and method for initial connection with a base station in consideration of mobility of a terminal in a communication system.

In accordance with an aspect of the present disclosure, there is provided an operation method of a UE in a wireless communication system, including: receiving a signal including broadcast information from a base station; determining an autocorrelation value using a repetitive pattern of the signal; determining whether the base station supports coverage extension on the basis of the autocorrelation value; and acquiring the broadcast information through decoding of the received signal when the base station supports the coverage extension.

In accordance with another aspect of the present disclosure, there is provided a UE device in a wireless communication system, including: a transmission and reception unit configured to receive a signal including broadcast information from a base station; and a control unit configured to determine an autocorrelation value using a repetitive pattern of the signal, to determine whether the base station supports coverage extension on the basis of the autocorrelation value, and to acquire the broadcast information through decoding of the received signal when the base station supports the coverage extension.

In accordance with still another aspect of the present disclosure, there is provided an operation method of each of a base station and a UE for initial connection, including: receiving a signal including broadcast information from the base station; determining an autocorrelation value using a repetitive pattern of the signal; determining whether the base station supports coverage extension on the basis of the autocorrelation value; and acquiring the broadcast information through decoding of the signal when it is determined that the base station supports the coverage extension.

In accordance with yet another aspect of the present disclosure, there is provided each of a base station and a UE for initial connection, including a transmission and reception unit configured to receive a signal including broadcast information from the base station; and a control unit configured to determine an autocorrelation value using a repetitive pattern of the signal, to determine whether the base station supports coverage extension on the basis of the autocorrelation value, and to acquire the broadcast information through decoding of the signal when it is determined that the base station supports the coverage extension.

DETAILED DESCRIPTION

Figure 1:
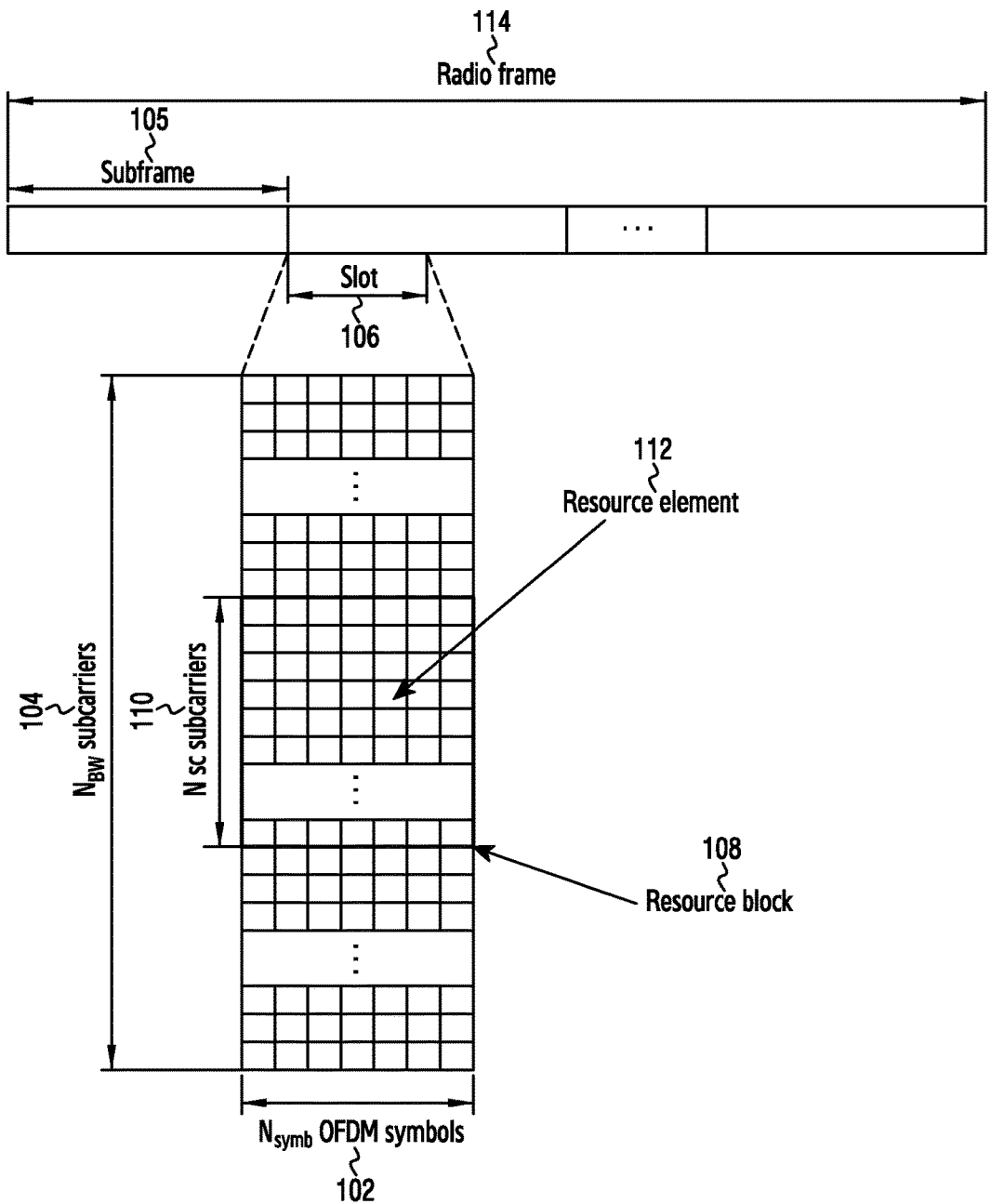
FIG. 1 illustrates a downlink frame structure in a communication system according to an embodiment of the present disclosure.

Hereinafter, the operational principle of the present disclosure will be described in detail with reference to the accompanying drawings. In describing various embodiments below, a detailed description of related known configurations or functions incorporated herein will be omitted when it is determined that the detailed description thereof may unnecessarily obscure the subject matter of the present disclosure. Terms described below are defined in consideration of functions in various embodiments, but may vary according to the intention or convention of a user or operator. Therefore, the definitions of the terms should be made based on the contents throughout the specification.

Hereinafter, the present disclosure describes a technique for a terminal to receive broadcast information from a base station in a wireless communication system. The present disclosure relates to a communication technique which combines a 5th generation (5G) communication system, for supporting a higher data rate following 4th Generation (4G) systems, with Internet of Things (IoT) technology, and to a system for the communication technique. The present disclosure may be applied to intelligent services (for example, smart homes, smart buildings, smart cities, smart cars or connected cars, health care, digital education, retail business, security, and safety-related services), on the basis of 5G communication technology and IoT-related technology.

Terms referring to broadcast information, terms referring to control information, terms related to communication coverage, terms (e.g., an event) referring to a state change, terms referring to network entities, terms referring to messages, terms referring to components of a device, and the like which are used in the following description are illustrated for convenience of description. Therefore, the present disclosure is not limited to the following terms, and other terms having equivalent technical meanings can be used.

Terms referring to coverage enhancement may be used instead of terms referring to coverage extension. Also, terms referring to coverage extension may be used instead of terms referring to coverage enhancement.

For convenience of description, some of terms and names defined in the 3rd generation partnership project long term evolution (3GPP LTE) standard may be used. However, the present disclosure is not limited by the above-mentioned terms and names, and can be equally applied to systems conforming to other standards.

First, a method for transmitting broadcast information in a communication system to which the present disclosure is applied will be described with reference to FIGS. 1 to 3.

Multiple access schemes in an LTE system which is a typical example of a communication system may include an orthogonal frequency division multiplexing (OFDM) scheme in a downlink and a single carrier frequency division multiple access (SC-FDMA) scheme in an uplink. The above-described multiple access schemes may be assigned and operated so as to prevent time-frequency resources to transmit data or control information for each user from overlapping each other, that is, to establish orthogonality, thereby classifying the data or control information of each user. Hereinafter, embodiments of the present disclosure will be described on the assumption that the communication system is an LTE system, but the embodiments of the present disclosure are also applicable to communication systems other than the LTE system.

FIG. 1 illustrates a downlink frame structure in a communication system according to an embodiment of the present disclosure. FIG. 1 shows a basic frame structure in a time and frequency domain, which is a radio resource region in which data or a control channel is transmitted in a downlink.

Referring to FIG. 1, in a plurality of rectangular shapes, the horizontal axis represents the time domain, and the vertical axis represents the frequency domain. The minimum transmission unit in the time domain is an OFDM symbol. $N_{symb}$ OFDM symbols 102 are gathered to form one slot 106, and two slots are gathered to form one subframe 105. The length of the one slot 106 is 0.5 ms, and the length of the subframe 105 is 1.0 ms. One radio frame 114 is a time domain unit constituted of 10 subframes.

The minimum transmission unit in the frequency domain is a subcarrier, and the bandwidth of a total system transmission band is composed of a total of $N_{BW}$ subcarriers 104.

The basic unit of resources in the time and frequency domain may be represented by an OFDM symbol index and a subcarrier index as a resource element (RE) 112. A resource block (RB) (or physical resource block (PRB)) 108 is defined as $N_{symb}$ consecutive OFDM symbols 102 in the time domain and $N_{SC}$ consecutive subcarriers 110 in the frequency domain. Accordingly, one RB 108 is composed of $N_{symb} \times N_{SC}$ REs 112, and the system transmission band is composed of a total of $N_{RB}=(N_{BW}/N_{SC})$ resource blocks.

In general, the minimum transmission unit of data is the RB unit. In the LTE system, $N_{symb}=7$, $N_{SC}=12$, and $N_{BW}$ and $N_{RB}$ are proportional to the bandwidth of the system transmission band. A data rate is increased in proportion to the number of RBs scheduled to a terminal. The LTE system defines and operates six transmission bandwidths.

In the case of an FDD system in which a downlink and an uplink are separated by frequencies, the downlink transmission bandwidth and the uplink transmission bandwidth may be different from each other. A channel bandwidth represents an RF bandwidth corresponding to the system transmission bandwidth. Table 1 below shows correspondence between the system transmission bandwidth defined in the LTE system and the channel bandwidth. An LTE system having a channel bandwidth of 10 MHz has a transmission bandwidth composed of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

In the case of downlink control information, it is transmitted within the first N OFDM symbols in the subframe. In general, N={1, 2, 3}. Accordingly, the value of N varies for each subframe according to an amount of control information to be transmitted in a current subframe. The control information includes a control channel transmission interval indicator indicating over how many OFDM symbols control information is transmitted, scheduling information about downlink data or uplink data, and a hybrid automatic retransmit request (HARD) response (ACK/NACK) signal, and the like.

A modulation scheme supported by the LTE system is one of quadrature phase shift keying (QPSK), 16 quadrature amplitude modulation (QAM), and 64 QAM, and each modulation order (Qm) corresponds to 2, 4, or 6. That is, a base station may transmit 2 bits per symbol for QPSK modulation, 4 bits per symbol for 16 QAM modulation, and 6 bits per symbol for 64 QAM modulation.

A terminal performs synchronization with the base station using a primary synchronization signal (PSS) and a secondary synchronization signal (SSS) transmitted from the base station in an initial connection procedure to the base station. After completing the synchronization with the base station, the terminal receives a master information block (MIB) and a system information block (SIB) transmitted from the base station, and acquires broadcast information necessary for communication with the base station in the future. Since the base station does not know the existence of the terminal until the broadcast information is acquired, the terminal then performs connection to the base station through a random access procedure.

The LTE system operating as described above may support low-cost and low-complexity user-equipment (UE) (hereinafter, referred to as "low-cost UE"), which are limited in some functions. The low-cost UE may be used for machine type communication (MTC) or machine-to-machine (M2M) services, which are mainly used for services such as remote meter reading, crime prevention logistics, etc. In addition, the low-cost UE can also be used as a means for realizing a cellular-based Internet of Things (IoT).

For low cost and low complexity, it is possible to reduce the cost of an RF element of the UE by limiting the number of reception antennas of the UE to one. Alternatively, the upper limit of a transport block size (TBS) that can be processed by the low-cost UE may be defined, thereby reducing the data reception soft buffer cost of the UE. In a typical LTE system, a UE has a broadband signal transmitting/receiving function for a minimum 20 MHz band regardless of the bandwidth of the system transmission band. However, a low-cost UE may achieve additional low cost and low complexity by limiting the maximum bandwidth to less than 20 MHz. For example, in an LTE system with a channel bandwidth of 20 MHz, the operation of a low-cost UE that supports only a channel bandwidth of 1.4 MHz may be defined.

The low-cost UE can be located in a shadow area of a building where the mobility is low according to MTC/M2M services or IoT services, but a person cannot reach. Accordingly, a method for enhancing the communication coverage of the low-cost UE is required.

In a standardization process of the current 3GPP LTE, it is assumed that a UE that needs to enhance the communication coverage needs to enhance the communication coverage of about 15 dB to 20 dB in comparison with the existing UE. Repetitive transmission or bundling of existing physical channels or newly defined physical channels is considered to enhance the communication coverage of the UE. Here, the repetitive transmission means that a subframe including information desired to be transmitted is repeatedly transmitted several times in the same manner. The bundling means that the same information is transmitted several times through a plurality of subframes, but is transmitted in a different HARQ redundancy version or a different physical channel format for each subframe. The base station and the receiver of the UE may enhance the communication coverage more than a general physical channel by soft-combining or accumulating a physical channel signal which is transmitted repeatedly or bundled. A repetitive level necessary for enhancing the communication coverage may be different depending on each physical channel used for an uplink and a downlink, and at the same time, each UE may have a different value. Here, the repetition level may indicate the repetition number of a physical subframe or may indicate a level with respect to the repetition number actually used. In the following description, repetition and bundling can be handled in a similar manner with regard to enhancing the communication coverage. Thus, even though only either repetition or bundling is mentioned, it should be understood to include both repetition and bundling. In addition, while discussions are underway to enhance the communication coverage on the basis of the low-cost UE in the 3GPP standardization process, it is assumed that the communication coverage enhancement can be obtained by the same method even in the case of a general UE requiring the communication coverage enhancement. Therefore, a method and device for receiving broadcast information for enhancing the communication coverage in an embodiment of the present disclosure can be equally applied to not only the low-cost UE but also all the UEs requiring the communication coverage enhancement.

Table 2 below shows the performance gain of a physical broadcast channel (PBCH) which is required for an LTE-based low-cost UE to achieve communication coverage enhancement of 15 dB or greater compared to a current LTE category 1 UE. The PBCH is a physical channel through which a base station transmits an MIB including broadcast information required for initial connection and communication of a UE. The LTE category 1 UE represents a UE supporting the lowest data rate on the basis of version release-8 of the LTE standard.

TABLE 2

|  | PUSCH | PBCH |
| --- | --- | --- |
| MCL for normal LTE (LTE category 1 UE) | 140.7 dB | 149.0 dB |
| MCL target for MTC UE | 155.7 dB | 155.7 dB |
| Required enhancement to reach 15 dB for New complexity UEs(1 Rx) | 19 dB | 10.7 dB |

In Table 2, a maximum coupling loss (MCL) is a maximum available loss value for achieving communication between a transmitter and a receiver. A path-loss between the transmitter and the receiver or several hardware losses must be less than an MCL value given in Table 2 to enable communication. In the LTE system, since the UE has the lowest MCL value of a physical uplink shared channel (PUSCH) used for transmitting data to the base station, the communication coverage of the PUSCH is relatively small compared to other channels. Thus, in order to enhance the communication coverage of the low-cost UE by 15 dB compared to an existing category 1 UE, it is necessary to enhance the communication coverage by 15 dB on the basis of the MCL of the PUSCH. For the above reason, a MCL target required to enhance the communication coverage of the PUSCH of the low-cost UE is 155.7 dB, and the design is required so that all the channels can satisfy the MCL target of 155.7 dB equally.

Referring to Table 2, in the case of the PBCH of an MTC UE, a performance gain of 6.7 dB is required in order to satisfy the MCL of 155.7 dB in comparison with the category 1 UE. However, the category 1 UE has two reception antennas and is capable of performing communication throughout the system band, while the low-cost UE has a single reception antenna and performs communication in a narrow band (for example, 1.4 MHz), and therefore an additional performance gain is required since an antenna gain and a diversity gain cannot be obtained. Assuming about 3 to 4 dB in addition to a normal antenna gain and diversity gain, the low-cost UE needs a performance gain of a total of 10.7 dB for PBCH for the purpose of the communication coverage enhancement of 15 dB compared to the category 1 UE.

One embodiment for the communication coverage extension is to extend the communication coverage by allowing a UE to repetitively receive or transmit the same initial signal from or to a base station. However, when the repetition of the initial signal transmitted from the base station to the UE is not sufficient, the UE cannot receive broadcast information of the base station according to the location or situation of the UE. Accordingly, the UE may not be able to communicate with the base station. For example, when a UE is a smart meter or a fixed sensor used in a shadow area such as a building underground, the UE cannot move, and therefore communication with the base station cannot be continuously performed when a broadcast signal is not received from the base station. Thus, the base station may transmit the broadcast signal through additional repetition within a predetermined frame compared to the conventional manner so that the UE used in the shadow area receives the broadcast signal. The UE may further perform combining on the repeated broadcast signal to enhance the coverage. That is, the base station additionally and repeatedly transmits the broadcast signal for the coverage extension of the UE used in the shadow area, compared to the conventional manner. The UE used in the shadow area cannot know whether the broadcast signal is additionally and repeatedly transmitted in a condition where it attempts to make initial connection. Accordingly, the UE has to combine the received signal, assuming that the base station always applies addition repetition to the transmission of the broadcast signal. However, when the UE used in the shadow area cannot receive the broadcast signal, it cannot be known whether the UE cannot receive the broadcast signal because the base station does not apply the coverage extension of the broadcast signal or whether the UE cannot receive the broadcast signal even though the base station applies the coverage extension of the broadcast signal. Accordingly, there is a need for a method in which a UE detects whether a base station applies the coverage extension to a broadcast signal in a communication system and receives broadcast information so that the communication coverage can be enhanced.

Figure 2:
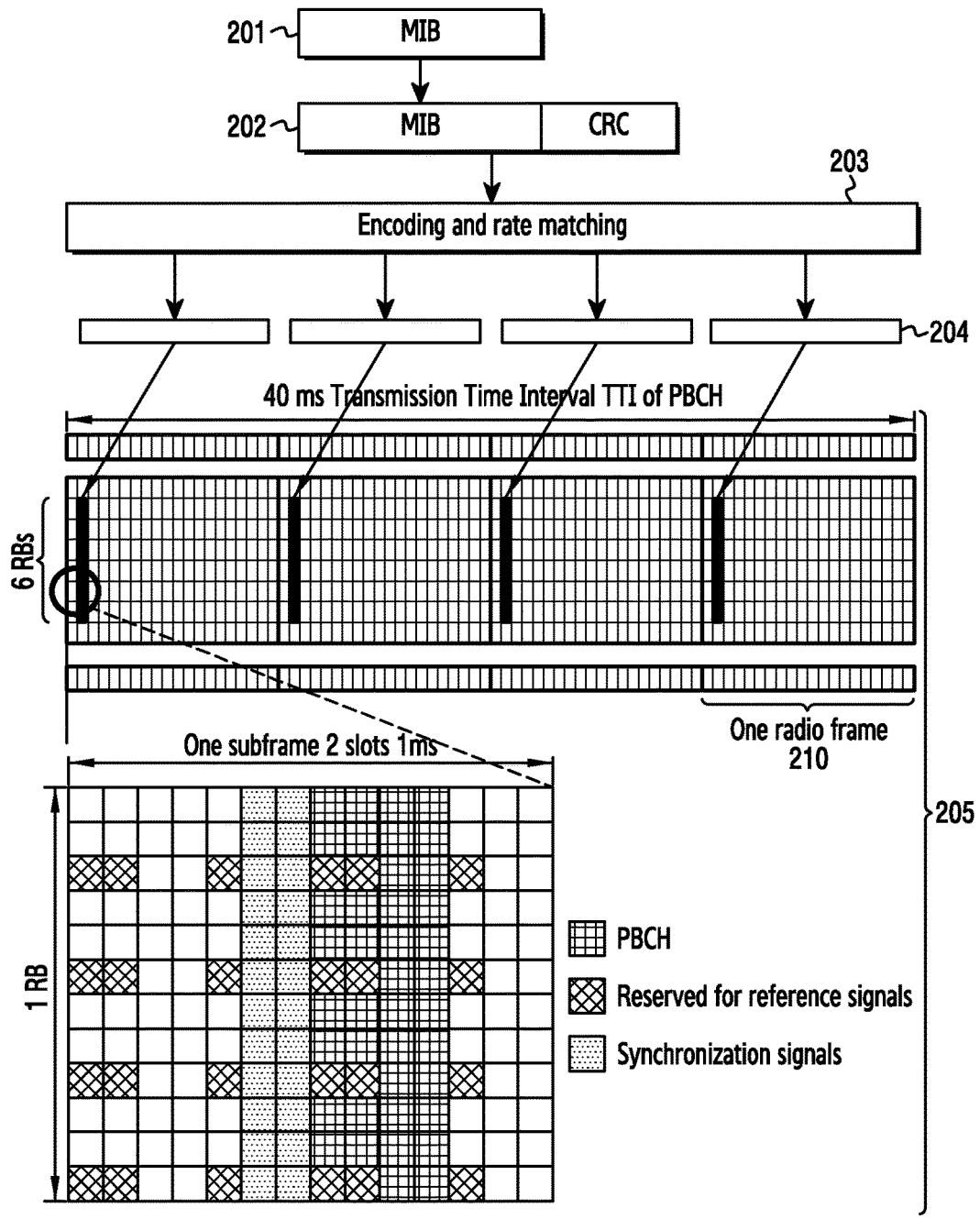
FIG. 2 illustrates a general method for a base station to transmit broadcast information to a terminal using a physical broadcast channel (PBCH) in a communication system according to an embodiment of the present disclosure.

FIG. 2 illustrates a general method for a base station to transmit broadcast information to a UE using a PBCH in a communication system according to an embodiment of the present disclosure.

Referring to FIG. 2, the base station generates one MIB 201 including broadcast information necessary for initial connection of the UE. The MIB is composed of 24 bits. The MIB includes 3-bit downlink system bandwidth information, 3-bit physical HARQ indicator channel (PHICH) configuration information, and 8-bit system frame number (SFN), and further includes reserved bits with a 10-bit size. In addition, information indicating whether the base station supports a communication coverage extension mode as a value of 1 or 2 bits may be added to the MIB for the UE requiring the communication coverage extension. Here, the "communication coverage extension" may be replaced with terms such as "broadcast information coverage extension", "PBCH coverage extension", etc.

The base station adds cyclic redundancy check (CRC) bits composed of 16 bits to the 24-bit MIB to generate a total of a 40-bit MIB bit string 202. The CRC bits are used to check whether an error bit is included in the 24-bit MIB in the MIB bit string which is received from the base station by the UE. For example, when the 24-bit MIB is divided by a predefined 16th order generator polynomial, the UE may determine the CRC bits by performing a logical exclusive OR operation on a mask bit sequence, which is determined according to the number of antenna ports used by the base station for the transmission of the PBCH in the remaining bit strings, may add the determined CRC bits to the MIB 201, and may transmit the MIB 201.

Next, the base station performs a channel encoding and rate matching operation 203 to transmit the MIB bit stream 202. In the channel encoding and rate matching operation 203, the 40-bit MIB bit string is encoded into a tail biting convolutional code (TBCC) having a coding rate of ⅓, and then is appropriately subjected to rate matching according to the number of REs used for the transmission of the PBCH. Through this channel encoding and rate matching operation 203, the base station may be robust to errors that may occur during the transmission of the PBCH from the base station to the UE. Channel encoding bits used in the channel encoding process are composed of 1920 bits in total in the case of a system using a normal cyclic prefix (normal CP), and composed of 1760 bits when an extended cyclic prefix (extended CP) is used.

The base station then segments the channel encoding bits composed of 1920 bits or 1760 bits into 4 bit strings 204. Reference numeral 204 denotes segmented four MIB bit strings. Next, the base station transmits the segmented four MIB bit strings 204 to the UE via the PBCH for 40 ms. Reference numeral 205 denotes a mechanism in which the four MIB bit strings 204 are transmitted to the UE via the PBCH. At this time, the PBCH is transmitted in the first subframe of each of four radio frames 210 constituting 40 ms. The PBCH is mapped to six RBs located in the middle of the system bandwidth in frequency. In addition, the PBCH is mapped to the first four OFDM symbols of a second slot over time in the case of a base station using frequency division multiplexing (FDD) and the normal CP. The four bit strings are transmitted in sequence via four PBCHs in 40 ms.

In addition, the four bit strings are respectively scrambled with a scrambling sequence, and at this time, a scrambling sequence generator is initialized to a cell ID every 40 ms. The PBCH transmitted in each radio frame uses a different scrambling sequence. Accordingly, the UE performs descrambling and decoding on the PBCH received in one radio frame with four other scrambling sequences. Next, the UE may check the CRC bits and may discern a reception point of time within 40 ms when there is no error. In addition, when the reception power is insufficient because the UE is not adjacent to the base station, the UE may receive all four PBCH signals and then may decode a channel signal through a combining process to check the MIB. When the decoded MIB does not include an error, the UE acquires downlink system bandwidth information, PHICH configuration information, and SFN information, which are broadcast information included in the MIB. The UE may perform communication with the base station using the acquired broadcast information.

The UE receives the PBCH to perform descrambling with the scrambling sequence, combines the segmented bit strings, and then performs channel decoding. The CRC bits are calculated in the same manner as the base station for the 24-bit MIB received from the base station for the decoded bit strings. The UE then compares the determined CRC bits with the received CRC bits. When the two CRC bits are the same, the UE determines that there is no error in the received 24-bit MIB. When the two CRC bits are not the same, the UE determines that there is an error in the received 24-bit MIB. At this time, since the number of antenna ports used by the base station to transmit the PBCH cannot be known at a point of time when the UE receives the MIB bit string from the base station, the UE has to receive the PBCH with a combination of all antenna ports. That is, the UE has to compare the CRC bits determined using the mask bit string corresponding to all the antenna ports with the received CRC bits.

As described with reference to FIG. 2, the base station periodically transmits the MIB including the same broadcast information for 40 ms via the PBCH in the four radio frames. However, among the information included in the MIB, an SFN field value increases by 1 every four radio frames. Accordingly, when the PBCH signals received after the four radio frames are combined with each other, the communication coverage cannot be enhanced. Thus, in order to extend the broadcast information reception coverage of the low-cost UE at present, the base station may repeatedly transmit the larger number of PBCHs within the four radio frames. While FIG. 2 above illustrates the FDD with the normal CP as an example, the corresponding operation is performed in a similar manner even in the case of the extended CP and TDD, and there is no difference in describing and understanding the present disclosure.

Figure 3:
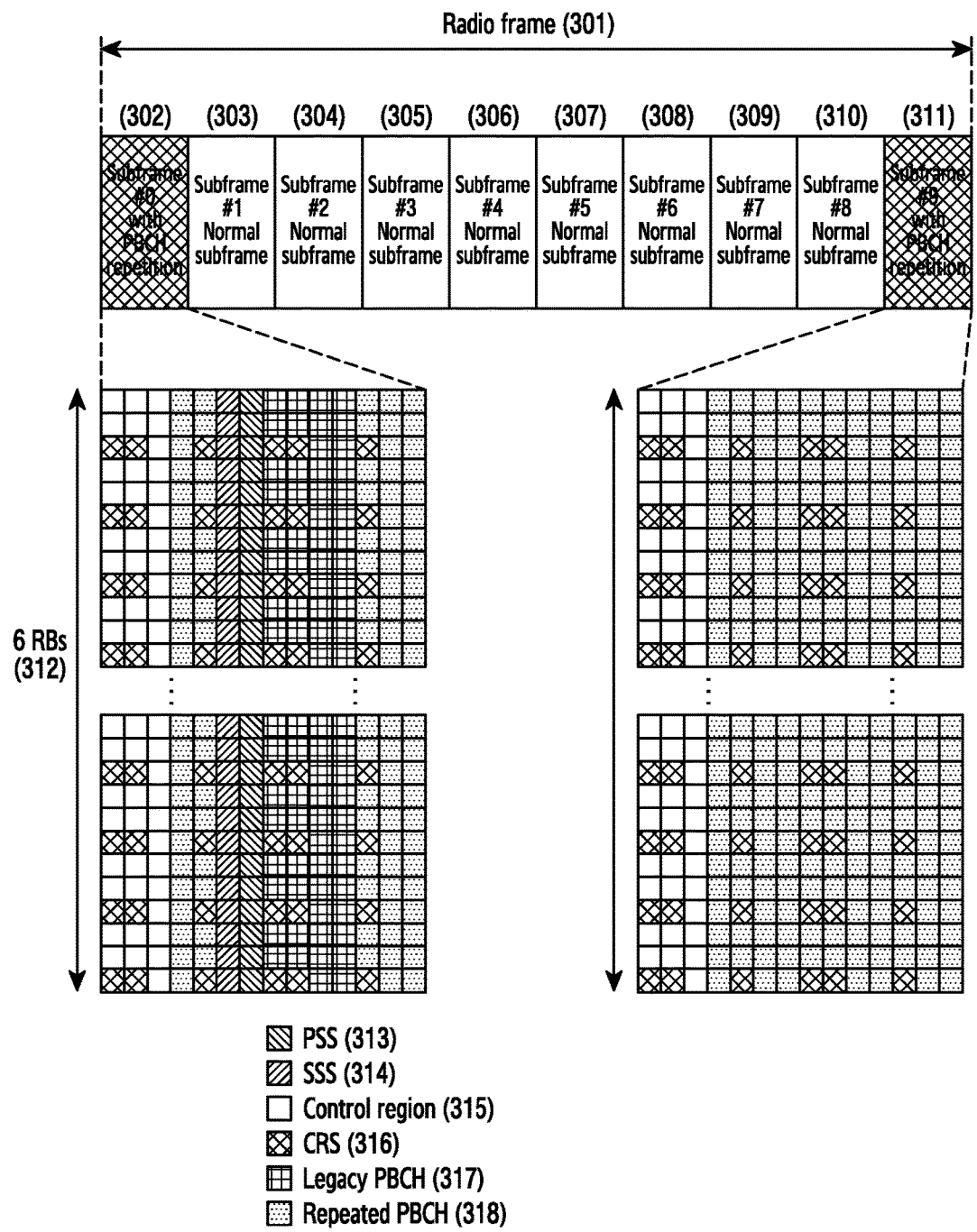
FIG. 3 illustrates a structure of a signal for repeatedly transmitting a PBCH in a communication system according to an embodiment of the present disclosure.

FIG. 3 illustrates a structure of a signal for repeatedly transmitting a PBCH in a communication system according to an embodiment of the present disclosure. FIG. 3 shows an embodiment of a structure for repeatedly transmitting a PBCH which is considered in the 3GPP LTE in order to enhance the PBCH communication coverage of a low-cost UE.

In FIG. 3, one radio frame 301 is composed of 10 subframes 302 to 311. An MTC-PBCH for the low-cost UE is configured such that a PBCH can be transmitted in two subframes of one radio frame unlike the existing system. Here, the MTC-PBCH is used to refer to a broadcast signal including all the PBCHs that are additionally and repeatedly transmitted for the purpose of the coverage extension of a legacy PBCH and the UE. In FIG. 3, as an example in which the MTC-PBCH is transmitted in the two subframes of the one radio frame, a structure in which the MTC-PBCH is transmitted in the first subframe 302 and the tenth subframe 311 is shown. FIG. 3 shows the example in which the MTC-PBCH is transmitted in the first subframe 302 and the tenth subframe 311, but the embodiment of the present disclosure is not limited to the transmission of the MTC-PBCH in a specific subframe. For example, in the case of TDD, the MTC-PBCH may be transmitted in the first subframe 302 and the sixth subframe 307. However, in describing the present disclosure, a separate description of this case is not required. In FIG. 3, it is assumed that two subframes are used for the transmission of the MTC-PBCH in the radio frame. However, the embodiment of the present disclosure is not limited to the case where there are two subframes in which the MTC-PBCH is repeated. In FIG. 3, a PBCH is repeatedly transmitted in addition to a legacy PBCH 317 in the first subframe 302 and the tenth subframe 311 in which the PBCH is transmitted. The PBCH, which is repeatedly transmitted in addition to the legacy PBCH, is used to repeatedly transmit the remaining REs 918 except for an RE region for a PSS 313, an SSS 314, a control signal region 315, and a CRS 316 within six middle RBs 312 of the system transmission band.

Accordingly, in the case of an FDD system using the normal CP, the base station may transmit the PBCH to the low-cost UE a total of 4.6 times in one radio frame. Thus, the low-cost UE may achieve PBCH communication coverage enhancement of about 6.6 dB compared to a PBCH reference transmitted once per one radio frame.

As mentioned in the above Table 2, in order to achieve the communication coverage enhancement corresponding to 15 dB of the low-cost UE, the PBCH needs the communication coverage enhancement of 10.7 dB in total. However, when the PBCH that is currently repeatedly transmitted from the base station to the low-cost UE is used, only the communication coverage enhancement of 6.6 dB can be obtained, so that sufficient communication coverage enhancement cannot be achieved. In the 3GPP LTE standardization for the low-cost UE at present, it is assumed that the insufficient communication coverage performance gain described above can be obtained using time diversity. That is, it is predicted that PBCH decoding will be possible when the low-cost UE obtains the gain according to the channel because the channel is improved even in the case where the communication coverage is insufficient.

At this time, when the base station performs additional repetitive transmission for the PBCH coverage extension of the UE in the shadow area, even if the UE fails MIB decoding using the current MTC-PBCH, MIB decoding can be successfully performed by attempting to receive the PBCH for a sufficient time during which the channel is improved in order to obtain a diversity gain. However, when the base station does not support the PBCH coverage extension, the UE has to stop the PBCH reception at the corresponding base station and moves to another center frequency, and then has to start the initial connection again. However, as described above, the low-cost UE that needs the coverage enhancement must decode the MIB to know whether the corresponding base station supports coverage enhancement for the broadcast information and other channels. Accordingly, in the process of receiving the PBCH, the UE must attempt to receive the PBCH, assuming that the base station supports the coverage enhancement of the PBCH. As a result, when a UE located in the shadow area fails to receive the current PBCH, it cannot be determined whether the corresponding cell fails to decode the MIB because it does not support the PBCH communication coverage enhancement, or whether MIB decoding is possible when there is only additional diversity because the corresponding cell supports the PBCH coverage enhancement. Therefore, in the embodiment of the present disclosure, a method and device for detecting whether a UE that needs communication coverage enhancement supports the coverage enhancement mode of the PBCH in an initial connection procedure is proposed.

Hereinafter, a base station may be an entity that performs resource allocation of a UE, and may be at least one of an eNodeB, a NodeB, a base station (BS), a wireless access unit, a controller of a base station, and a node on a network. A terminal may include user equipment (UE), a mobile station (MS), a cellular phone, a smart phone, a computer, or a multimedia system capable of performing communication functions. In the embodiment of the present disclosure, a downlink refers to a wireless transmission path of a signal transmitted from a base station to a UE, and an uplink refers to a wireless transmission path of a signal transmitted from a UE to a base station. In the following description, embodiments of the present disclosure will be described by taking an LTE or LTE-A system as an example, but the embodiments of the present disclosure may be applied to other communication systems having a similar technical background or channel form. In addition, the embodiments of the present disclosure can be applied to other communication systems through some modifications within the scope of the present disclosure without departing from the scope of the present disclosure by the judgment of a person skilled in the art.

Figure 4A:
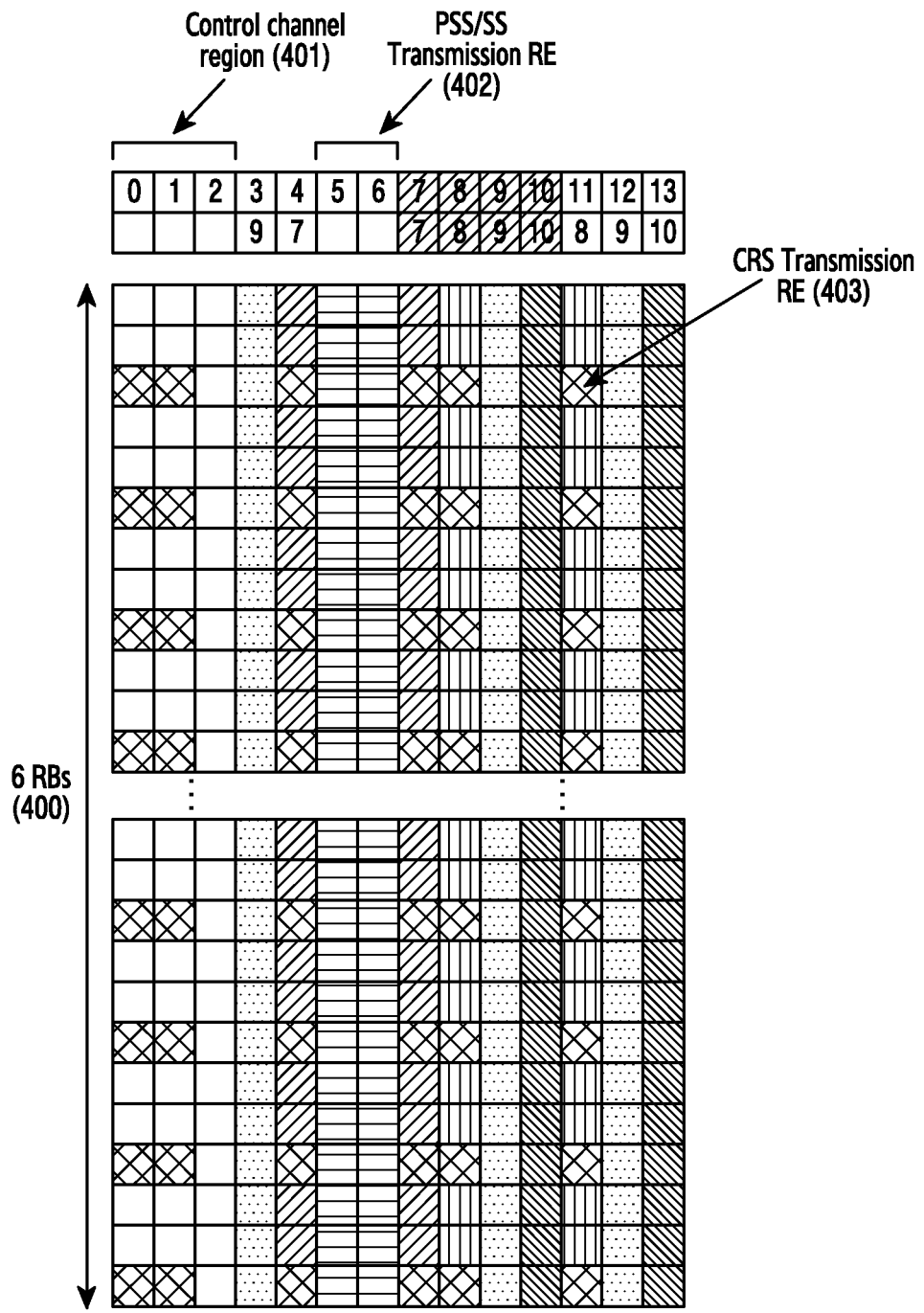
FIGS. 4A, 4B, and 4C illustrate specific examples of a structure for repeatedly transmitting a PBCH for coverage extension of broadcast information in a communication system according to an embodiment of the present disclosure.
Figure 4B:
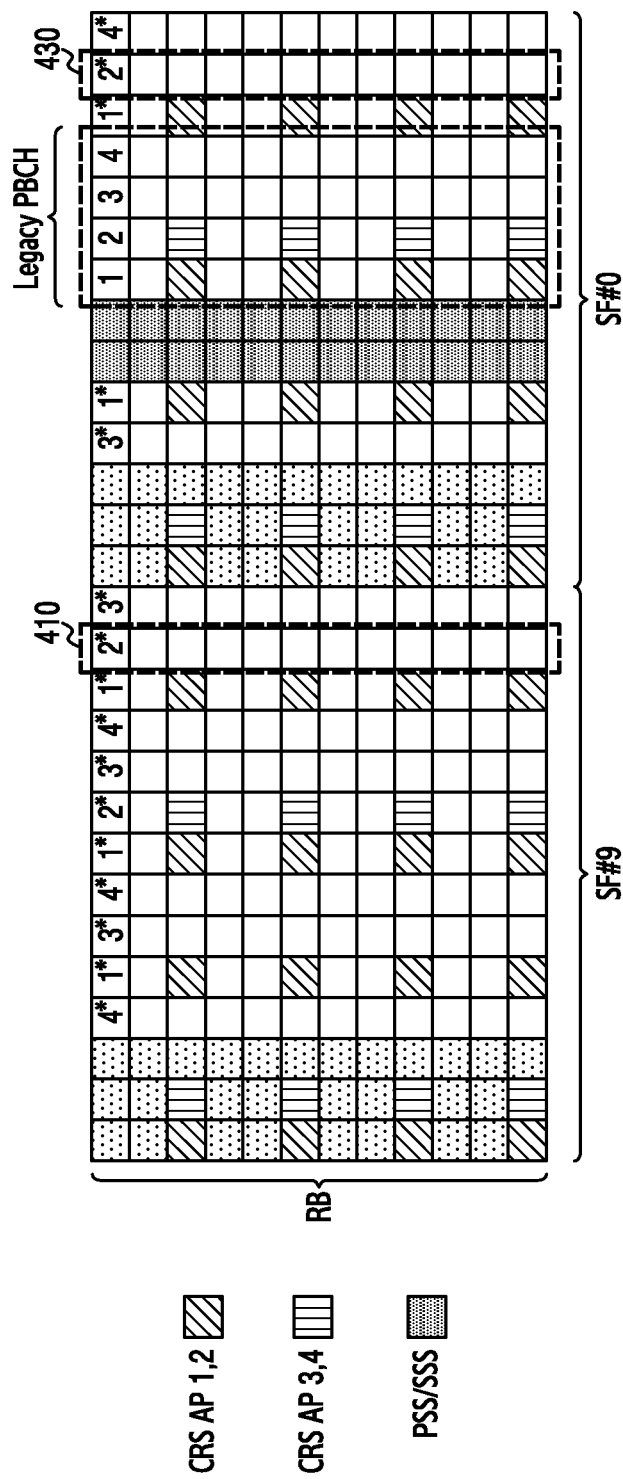
Figure 4C:
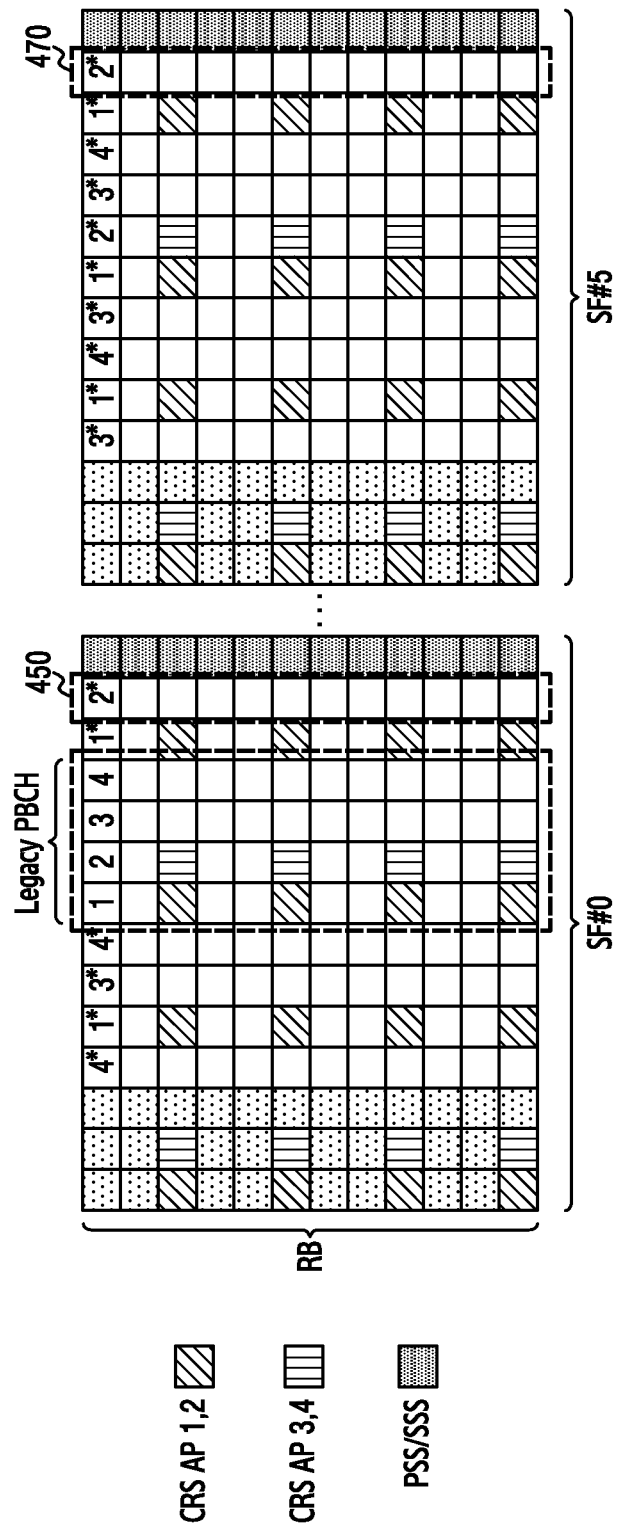

FIGS. 4A, 4B, and 4C illustrate specific examples of a structure for repeatedly transmitting a PBCH for coverage extension of broadcast information in a communication system according to an embodiment of the present disclosure.

FIG. 4A shows a PBCH repetition structure in a 0th subframe in which a legacy PBCH is transmitted. In the PBCH repetitive transmission for the coverage extension, the PBCH may be transmitted in six RBs located in the middle of the same system transmission band as the legacy PBCH. In a region where the PBCH is repeatedly transmitted, the repetitive transmission may be performed using all the remaining REs except for a control channel region 401, a PSS/SSS transmission RE 402, and a CRS transmission RE 403 in six resource blocks 400 of the 0th subframe. The repetition of the PBCH may be achieved in units of OFDM symbols to estimate a frequency offset. Specifically, the OFDM symbol including the RE for CRS transmission among the OFDM symbols that transmit a legacy PBCH may be mapped to the OFDM symbol including the CRS among the OFDM symbols that can be used for the repetition of the remaining PBCHs and may be repeatedly transmitted. Of the OFDM symbols that transmit the legacy PBCH, the OFDM symbol that does not include the CRS may be mapped to the OFDM symbol that does not include the CRS among the OFDM symbols that can be used for the repetitive transmission of the PBCH and may be repeatedly transmitted. That is, within one subframe, the OFDM symbol including the CRS may be mapped to the OFDM symbol including the CRS to perform the repetition of the legacy PBCH and may be repeatedly transmitted. Alternatively, the OFDM symbol that does not include the CRS may be mapped to the OFDM symbol that does not include the CRS and may be repeatedly transmitted. Referring to FIG. 4A, the PBCH transmitted in an OFDM symbol #7 may be additionally and repeatedly transmitted in an OFDM symbol #4. In addition, the PBCH transmitted in an OFDM symbol #8 may be additionally and repeatedly transmitted in an OFDM symbol #11. In addition, the PBCH transmitted in an OFDM symbol #9 may be additionally and repeatedly transmitted in OFDM symbols #3 and #12. Finally, the PBCH transmitted in an OFDM symbol #10 may be repeatedly transmitted in the OFDM symbol #10. However, the PBCH repetitive mapping pattern in units of OFDM symbols shown in FIG. 4A is shown as one embodiment, and therefore, the technical idea of the present disclosure is not limited to the above-described mapping pattern but may include any embodiment in which the mapping is applied in units of OFDM symbols.

FIGS. 4B and 4C show other embodiments of the PBCH repetitive mapping pattern by the same or similar method as in FIG. 4A. Specifically, FIG. 4B shows an embodiment of the PBCH repetitive mapping in a frequency division duplexing (FDD) communication system, and FIG. 4C shows another embodiment of the PBCH repetitive mapping in a time division duplexing (TDD) communication system.

Referring to FIG. 4B, in the FDD communication system, a specific embodiment is shown in which the PBCH is repeated in a subframe #0 (SF #0) and a subframe #9 (SF #9). In FIG. 4B, the subframe #9 belongs to the previous radio frame of a radio frame to which the subframe #0 belongs. In the same manner as in FIG. 4A, the OFDM symbol including the CRS may be mapped to the OFDM symbol including the CRS and may be repeatedly transmitted in order to repeat the legacy PBCH within the subframe in principle even in FIG. 4B. Alternatively, the OFDM symbol that does not include the CRS may be mapped to the OFDM symbol that does not include the CRS and may be repeatedly transmitted. Specifically, the legacy PBCH transmitted from the OFDM symbol #1 including CRS APs 1 and 2 of the subframe #0 may be mapped to an OFDM symbol 1* bundle including the CRS APs 1 and 2 in the subframes #0 and #9 and may be repeatedly transmitted. Alternatively, the legacy PBCH transmitted from the OFDM symbol #3 that does not include the CRS of the subframe #0 may be mapped to an OFDM symbol 3* bundle that does not include the CRS in the subframes #0 and #9 and may be repeatedly transmitted. However, referring to reference numerals 410 and 430, a basic PBCH transmitted from the OFDM symbol #2 including the CRS APs 1 and 2 of the subframe #0 may be mapped to an OFDM symbol 2* bundle 430 that does not include the CRS APs 1 and 2 of the subframe #0 and an OFDM symbol 2* bundle 410 that does not include the CRS APs 1 and 2 of the subframe #9 and may be repeatedly transmitted. In this case, the REs corresponding to the CRS APs 1 and 2 may not be repeatedly mapped, all of the REs corresponding to the CRS APs 1 and 2 may be repeatedly mapped (that is, even the CRS may be repeatedly mapped), or a PBCH mapped to REs adjacent to the REs corresponding to the CRS APs 1 and 2 may be repeatedly mapped again. The PBCH mapping pattern shown in FIG. 4B is proposed as one embodiment, and may include any other mapping patterns that do not depart from the technical idea of the present disclosure.

Referring to FIG. 4C, in the TDD communication system, a specific embodiment is shown in which the PBCH is repeated in a subframe #0 (SF #0) and a subframe #5 (SF #5). In FIG. 4C, the subframe #5 belongs to the same radio frame as the radio frame to which the subframe #0 belongs. In the same manner as in FIG. 4A, the OFDM symbol including the CRS may be mapped to the OFDM symbol including the CRS and may be repeatedly transmitted in order to repeat the legacy PBCH within the subframe even in FIG. 4C. Alternatively, the OFDM symbol that does not include the CRS may be mapped to the OFDM symbol that does not include the CRS and may be repeatedly transmitted. Specifically, the legacy PBCH transmitted from the OFDM symbol #1 including CRS APs 1 and 2 of the subframe #0 may be mapped to an OFDM symbol 1* bundle including the CRS APs 1 and 2 in the subframes #0 and #5 and may be repeatedly transmitted. Alternatively, the legacy PBCH transmitted from the OFDM symbol #3 that does not include the CRS of the subframe #0 may be mapped to an OFDM symbol 3* bundle that does not include the CRS in the subframes #0 and #9 and may be repeatedly transmitted. However, referring to reference numerals 450 and 470, a basic PBCH transmitted from the OFDM symbol #2 including the CRS APs 1 and 2 of the subframe #0 may be mapped to an OFDM symbol 2* bundle 450 that does not include the CRS APs 1 and 2 of the subframe #0 and an OFDM symbol 2* bundle 470 that does not include the CRS APs 1 and 2 of the subframe #5 and may be repeatedly transmitted. In this case, the REs corresponding to the CRS APs 1 and 2 may not be repeatedly mapped, all of the REs corresponding to the CRS APs 1 and 2 may be repeatedly mapped (that is, even the CRS may be repeatedly mapped), or a PBCH mapped to REs adjacent to the REs corresponding to the CRS APs 1 and 2 may be repeatedly mapped again. The PBCH mapping pattern shown in FIG. 4C is proposed as one embodiment, and may include any other mapping patterns that do not depart from the technical idea of the present disclosure.

In the case of performing mapping as described above, since the same signal is transmitted in units of OFDM symbols, performing autocorrelation using a repetitive pattern has an advantage of estimating a frequency offset. A UE that needs coverage extension because it is located in a shadow area performs channel estimation combining over several subframes at the time of channel estimation for additional coverage extension. At this time, a carrier frequency offset may exist between the UE and the base station. In this case, coherent combining cannot be performed at the time of channel estimation, and the performance may be deteriorated. Accordingly, the UE located in the shadow area needs to accurately estimate and compensate for the frequency offset at the time of downlink reception, and may estimate the accurate frequency offset using a PBCH repetitive pattern as shown in Equation 1. Equation 1 shows a frequency offset estimation formula using the repetitive pattern of the PBCH repeated for the coverage extension as described above.

$$\Delta f(\text{Hz}) = \frac{1}{2\pi(T_{SYM} + T_{CP}) \cdot N} \arg\left\{\sum_{k \in \{K\}} Y_{l+N}(k)^* \cdot Y_l(k)\right\} \quad \text{Equation 1}$$

In Equation 1, $Y_l(k)$ denotes a value of a QPSK symbol corresponding to a l-th OFDM symbol and a k-th subcarrier constituting one subframe. N denotes a value obtained by indicating an interval between the OFDM symbol in which the legacy PBCH is transmitted and the OFDM symbol in which the repeated PBCH is transmitted, as the number of OFDM symbols. $T_{SYM}$ denotes a time period of an OFDM symbol, $T_{CP}$ denotes a time period corresponding to a cyclic prefix, and $\{K\}$ denotes a set of indexes of subcarriers used for frequency offset estimation in the frequency domain. In Equation 1, arg $\{A\}$ denotes a phase of a complex number A. Here, l-th and (l+N)-th OFDM symbols should be configured to indicate an OFDM symbol through which the legacy PBCH is transmitted and a symbol through which the repeated PBCH is transmitted. As described above, for the purpose of the PBCH coverage extension, the PBCH for the existing UE is repeatedly mapped on the remaining region in units of OFDM symbols. Accordingly, the UE located in the shadow area may estimate the frequency offset existing between the base station and the UE before decoding the PBCH using Equation 1 (i.e., without decoding the PBCH). In order to further improve the frequency offset estimation performance, the UE may further improve the frequency offset estimation performance by averaging a frequency offset estimation value "Δf" estimated from all OFDM symbols used for the PBCH repetitive transmission.

As described above, when correlation between the same OFDM symbols is calculated according to the PBCH repetition, a high correlation value may be obtained. On the other hand, when correlation between OFDM symbols which are not the same is calculated, a low correlation value close to zero may be obtained. Accordingly, the present disclosure proposes a method for determining whether the base station that is currently attempting to make connection supports the PBCH coverage extension through correlation using the repetitive pattern, when the low-cost UE receives the PBCH.

As described above, when receiving the PBCH, the UE located in the shadow area may know whether the base station supports the coverage extension even after MIB decoding is successfully performed by receiving the PBCH. However, when the reception of the PBCH and the MIB decoding fail, the UE cannot determine whether the MIB decoding fails because the base station does not support the PBCH coverage extension, or whether the MIB decoding fails due to a poor channel condition even though the base station supports the coverage extension. In the case in which the UE is aware of whether the base station supports the coverage extension mode when the MIB decoding fails, the UE may operate more efficiently. That is, in the case in which the MIB decoding fails because the base station does not support the coverage extension, it is preferable that the UE located in the shadow area moves to another frequency or another cell and attempts to make initial connection. On the other hand, when the MIB decoding fails due to the poor channel condition even though the base station supports the coverage extension, it is preferable that the UE attempts to receive the PBCH and to decode the MIB several times to obtain time diversity.

Therefore, for the above-described reason, in a first embodiment of the present disclosure, autocorrelation between a PBCH for an existing UE and an additionally repeated PBCH for coverage enhancement is performed. A method for determining whether the base station supports the coverage extension of the PBCH by comparing a resultant value of the autocorrelation with an arbitrary threshold value "X" is proposed. According to the first embodiment of the present disclosure, Equation 2 shows a method in which a UE determines whether a base station supports the PBCH coverage extension on the basis of autocorrelation calculation.

PBCH coverage enhancement detected if $\Phi \geq$ threshold    Equation 2

PBCH coverage enhancement not detected if $\Phi <$ threshold where $\Phi = \left| \sum_{l} \sum_{k \in \{K\}} Y_{l+N}(k)^* \cdot Y_l(k) \right|$ In Equation 2, $Y_l(k)$ denotes a value of a QPSK symbol corresponding to an l-th OFDM symbol and a k-th subcarrier constituting one subframe. N denotes a value obtained by indicating an interval between the OFDM symbol in which the legacy PBCH is transmitted and the OFDM symbol in which the repeated PBCH is transmitted, as the number of OFDM symbols. {K} denotes a set of indexes of subcarriers used for frequency offset estimation in the frequency domain. Here, 1-th and (1+N)-th OFDM symbols should be configured to indicate an OFDM symbol through which the legacy PBCH is transmitted and a symbol through which the repeated PBCH is transmitted. It can be assumed that the autocorrelation value $\Phi$ determined through Equation 2 is larger than a predetermined threshold value "X". In this case, the UE may determine that the base station to which the UE is currently connected supports the coverage extension for the transmission of the PBCH. As described above, this determination is made because the legacy PBCH and the additionally repeated PBCH are repeated in units of OFDM symbols in one subframe. That is, since the PBCH is repeated in units of OFDM symbols in one subframe, autocorrelation between the OFDM symbols may be determined to be high. On the contrary, it can be assumed that the autocorrelation value $\Phi$ calculated in Equation 2 is smaller than the predetermined threshold value "X". In this case, the UE may determine that the base station to which the UE is currently connected does not support the coverage extension for the transmission of the PBCH. As described above, this determination is made because there is no autocorrelation between two OFDM symbols which are not the same. That is, even if the UE assumes the PBCH repetition and performs autocorrelation, a low correlation value is obtained as a result of applying Equation 2.

In addition, there is proposed a method in which a UE averages the estimated value $\Phi$ in all of the OFDM symbols used for the PBCH repetitive transmission and compares the averaged result with the threshold value "X" in order to further improve the performance and reliability of the determining whether the PBCH repetition is performed.

Two subframes in which the PBCH is transmitted in one radio frame may be mapped to the same PBCH and may be repeatedly transmitted. That is, in the case of an FDD, it can be considered that the PBCH transmitted in the existing subframe #0 and the PBCH transmitted in the subframe #9 are repeated in the same signal and the same pattern. In this case, there is proposed a method in which the UE calculates the autocorrelation in units of subframes and compares the calculated result with a threshold value to determine whether the coverage extension of the PBCH is achieved. For example, autocorrelation between the subframe #0 and the subframe #9 may be calculated and the calculated result may be compared with the threshold value "X" to determine whether the coverage extension of the PBCH is achieved. Here, the subframe #9 may be a subframe of the previous radio frame of the subframe #0 or a subframe of the same radio frame as the subframe #0. In addition, in the case of a TDD, it can be assumed that the PBCH transmitted in the existing subframe #0 and the PBCH transmitted in the subframe #5 are repeated in the same signal and the same pattern. In addition, there is proposed a method in which the UE calculates the autocorrelation in units of subframes and compares the calculated result with the threshold value "x" to determine whether the base station supports the coverage extension of the PBCH. Here, the subframe #5 exists within the same radio frame as the subframe #0.

Figure 5:
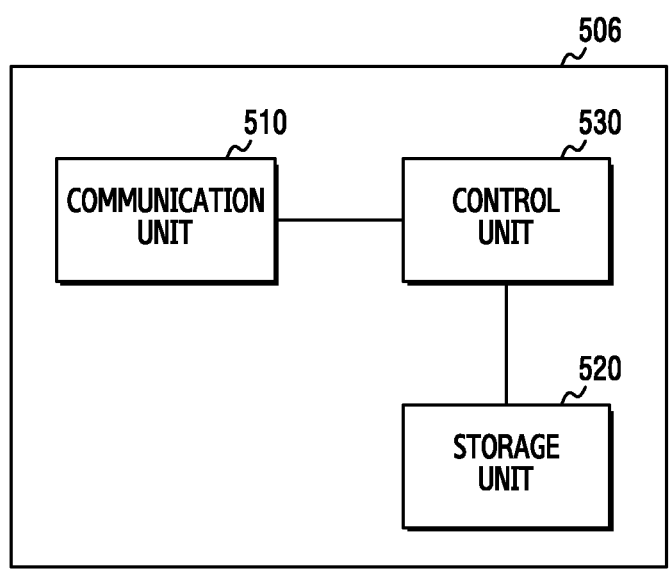
FIG. 5 is a block diagram illustrating a terminal according to an embodiment of the present disclosure.

FIG. 5 is a block diagram illustrating a UE according to an embodiment of the present disclosure. Referring to FIG. 5, a UE 500 includes a communication unit 510, a storage unit 520, and a control unit 530.

The communication unit 510 performs functions for transmitting and receiving signals through a wireless channel. For example, the communication unit 510 performs a conversion function between a baseband signal and a bit string according to a physical layer standard of a system. For example, at the time of data transmission, the communication unit 510 generates complex symbols by encoding and modulating a transmission bit string. Also, at the time of data reception, the communication unit 510 demodulates a baseband signal and restores a reception bit string through decoding. Also, the communication unit 510 up-converts the baseband signal into an radio frequency (RF) band signal, transmits the corresponding signal through an antenna, and down-converts the RF band signal received through the antenna to a baseband signal. For example, the communication unit 510 may include a transmission filter, a reception filter, an amplifier, a mixer, an oscillator, a digital to analog converter (DAC), an analog to digital converter (ADC), and the like.

In addition, the communication unit 510 may include a plurality of RF chains. Further, the communication unit 510 may perform beamforming. For beamforming, the communication unit 510 may adjust the phase and size of each of signals transmitted and received through a plurality of antennas or antenna elements. Further, the communication unit 510 may include a plurality of communication modules to support a plurality of different wireless connection technologies.

In addition, the communication unit 510 may include different communication modules for processing signals of different frequency bands. For example, different communication standards may include Bluetooth low energy (BLE), Wireless Fidelity (Wi-Fi), Wi-Fi Gigabyte (WiGig), cellular networks (e.g., Long Term Evolution (LTE), and the like. Also, different frequency bands may include a super high frequency (SHF) (e.g., 2.5 GHz, 5 GHz) band and a millimeter wave (e.g., 60 GHz) band. In particular, according to various embodiments below, the communication unit 510 may receive signals including broadcast information from a base station.

The communication unit 510 transmits and receives signals as described above. Accordingly, the communication unit 510 may be referred to as a transmission unit, a reception unit, or a transmission/reception unit. In the following description, transmission and reception performed through a wireless channel are used to mean that the above-described processing is performed by the communication unit 510.

The storage unit 520 stores data such as a basic program, an application program, or setting information for the operation of a UE. The storage unit 520 may be composed of a volatile memory, a nonvolatile memory, or a combination of the volatile memory and the nonvolatile memory. The storage unit 520 stores programs related to an operation of receiving broadcast information performed in the communication system according to an embodiment of the present disclosure and various types of data under the control of the control unit 530. In particular, the storage unit 520 may store a predetermined threshold value for comparison with an autocorrelation value determined through the control unit 530, according to various embodiments described below. The threshold value may be used to determine whether a base station supports PBCH coverage extension through comparison with the determined autocorrelation value. The storage unit 120 provides the stored data in response to the request of the control unit 130.

The control unit 530 controls overall operations of the UE. For example, the control unit 530 transmits and receives signals through the communication unit 510. In addition, the control unit 530 records data in the storage unit 520 and reads the data. To this end, the control unit 530 may include at least one processor or microprocessor, or may be a part of the processor. Also, a part of the communication unit 510 and the control unit 530 may be referred to as a communication processor (CP). In particular, the control unit 530 may control the UE to perform the procedure shown in FIG. 6 according to various embodiments described below. In particular, the control unit 530 may perform autocorrelation calculation on the received signal to determine whether the base station supports the PBCH coverage extension. In addition, the control unit 530 may perform frequency offset estimation and compensation on the received signal on the basis of the autocorrelation calculation. In addition, the control unit 530 may determine whether a UE moves to another center frequency by comparing the number of times of decoding on the received signal with a threshold value. The control unit 530 may control the UE to perform the procedure shown in flowcharts of FIGS. 7 to 11 for initial connection with the base station.

Hereinafter, terms such as " . . . unit", "-er (or)", and the like used below denote a unit for processing at least one function or operation, and the at least one function or operation may be implemented by hardware, software, or a combination of hardware and software.

Figure 6:
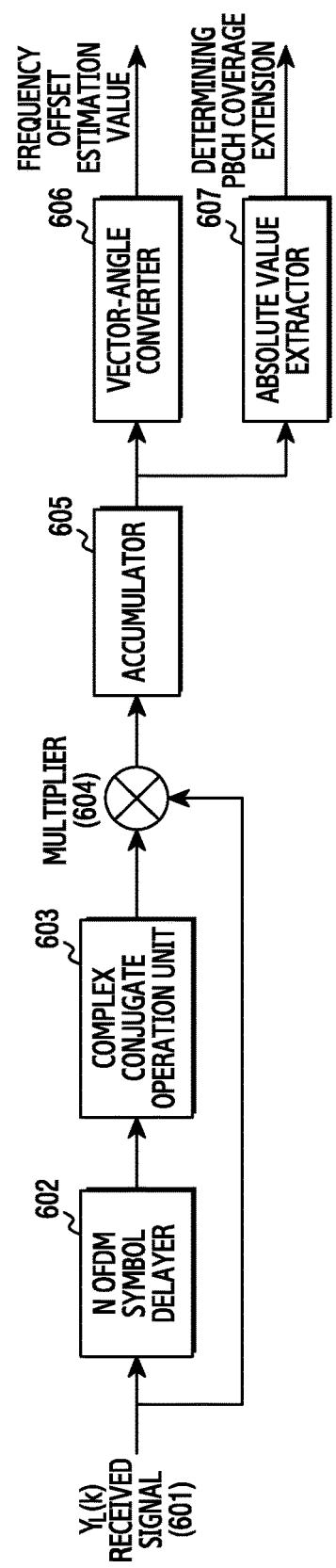
FIG. 6 is a block diagram illustrating a method in which a terminal determines whether the communication coverage extension of a base station is achieved using a PBCH repetitive pattern and estimates a frequency offset according to an embodiment of the present disclosure.

FIG. 6 is a block diagram illustrating a method in which a UE determines whether the communication coverage extension of a base station is achieved using a PBCH repetitive pattern and estimates a frequency offset according to an embodiment of the present disclosure. The series of operations described with reference to FIG. 6 may be executed through the communication unit 510 or the control unit 530 of FIG. 5 mentioned above.

Referring to FIG. 6, when a received signal $Y_l(k)$ 601 is received, the corresponding signal is stored for an N OFDM symbol time in an N OFDM symbol delayer 602. The output signal of the OFDM symbol delayer 602 is input to a complex conjugate operation unit 603 to perform a complex conjugate operation. The multiplier 604 performs a multiplication operation on the output signal of the complex conjugate operation unit 603 and the received signal 601. An accumulator 605 accumulates the operation value of the multiplier 604 with respect to subcarriers used for the PBCH transmission. The operation from the input of the received signal 601 to the accumulator 605 may be equally used for a frequency offset estimation method using a PBCH repetitive pattern and a PBCH coverage extension detection method. That is, the operation from the input of the received signal 601 to the accumulator 605 is achieved by performing $$\sum_{k \in \{K\}} Y_{l+N}(k)^* \cdot Y_l(k),$$

that is, a common operation in Equations 1 and 2 described above. The operation from the input of the received signal 601 to the accumulator 605 may be referred to as an autocorrelation calculation. Therefore, one common module from the N OFDM symbol delayer 602 to the accumulator 605 may be shared and used simultaneously for frequency offset estimation and PBCH coverage extension detection. The output of the accumulator 605 is input to a vector-angle converter 606. The vector-angle converter 606 may estimate a frequency offset by extracting phase information using accumulated vectors. That is, the vector-angle converter 606 may estimate the frequency offset, for example, through Equation 1. Although not shown through drawings, the estimated frequency offset may be used to compensate for the frequency offset of a signal that is transmitted to a frequency offset compensator and is received in the future. In addition, the output of the accumulator 605 may be used to be input to an absolute value extractor 607, to extract the size of the accumulated vector value, and to compare the extracted size with the predetermined threshold value "X" to thereby determine the PBCH coverage extension.

As described above, since the common module is used for the frequency offset estimation and the PBCH coverage extension detection, there is an advantage in implementing a UE so as to have a small complexity.

A second embodiment of the present disclosure proposes an initial connection process of the UE on the basis of the detection result of PBCH coverage extension according to the first embodiment. As described above, when the UE located in the shadow area can be aware of whether the base station supports the PBCH coverage extension before PBCH decoding in the initial connection process, the efficient operation of the UE is possible.

Figure 7:
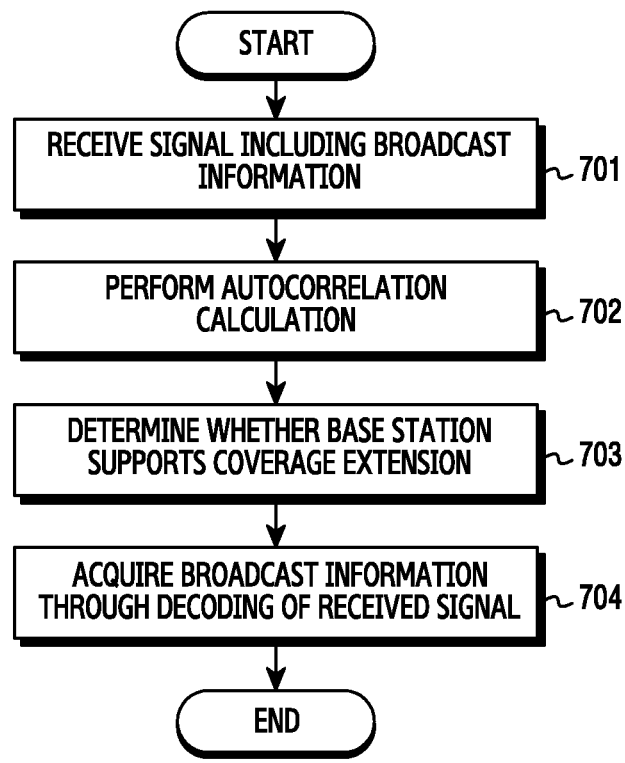
FIG. 7 is a flowchart illustrating a first embodiment in which a terminal according to an embodiment of the present disclosure performs initial connection to a base station through autocorrelation calculation.

FIG. 7 is a flowchart illustrating a first embodiment in which a UE according to an embodiment of the present disclosure performs initial connection to a base station through autocorrelation calculation.

Referring to FIG. 7, in operation 701, a UE may receive a signal including broadcast information. The reception of the signal may be performed through the communication unit 510 of FIG. 5. Specifically, the UE may perform synchronization with a base station using PSS/SSS transmitted by the base station in the initial connection to the base station. After the synchronization with the base station is completed, the UE may receive an MIB and an SIB transmitted by the base station and may acquire broadcast information necessary for communication with the base station in the future.

When operation 701 is completed, the UE proceeds to operation 702, and may perform autocorrelation calculation. The UE may perform autocorrelation calculation assuming that the base station supports PBCH coverage extension. According to an embodiment, the UE may perform autocorrelation calculation in units of OFDM symbols. That is, the UE may perform autocorrelation calculation between an OFDM symbol in which a legacy PBCH is transmitted and an OFDM symbol (determined in advance according to the method proposed in FIGS. 4A to 4C) for transmitting the repeated PBCH. For example, referring to FIG. 4A, assuming that the base station supports the PBCH coverage extension, the PBCH transmitted in an OFDM symbol #7 is further repeated in an OFDM symbol #4. Accordingly, the UE may perform autocorrelation calculation between the OFDM symbols #4 and #7. According to another embodiment, the UE may perform autocorrelation calculation in units of subframes. Two subframes in which a PBCH is transmitted in one radio frame may be mapped to the same PBCH and may be repeatedly transmitted. In this case, the UE may perform autocorrelation calculation in units of subframes. For example, in the case of an FDD, when a PBCH transmitted in a subframe #0 and a PBCH transmitted in a subframe #9 are repeated in the same signal and the same pattern, autocorrelation calculation between the subframe #0 and the subframe #9 may be performed. Here, the autocorrelation calculation may be $$\sum_{k \in \{K\}} Y_{l+N}(k)^* \cdot Y_l(k),$$

which is a common operation in Equations 1 and 2.

When autocorrelation calculation between the OFDM symbols or autocorrelation calculation between the subframes in which the PBCH is repeated is completed, the UE proceeds to operation 703. In operation 703, the UE may determine whether the autocorrelation value is greater than (or equal to or greater than) a predetermined threshold value "X". The autocorrelation value may be determined using Equation 2 on the basis of autocorrelation calculation performed in operation 702. In one embodiment, when the PBCH is repeated in units of the OFDM symbols or in units of the subframes, that is, when the base station supports the PBCH coverage extension, the autocorrelation value may be determined to be greater than the threshold value "X". In this case, the UE may determine that the base station supports the PBCH coverage extension. According to another embodiment, when the PBCH is not repeated in units of the OFDM symbols or in units of the subframes, that is, when the base station does not support the PBCH coverage extension, the autocorrelation value may be close to zero and may be determined to be smaller than the threshold value "X". In this case, the UE may determine that the base station does not support the PBCH coverage extension. In this case, communication with the base station currently receiving the PBCH may be interrupted and another center frequency or another cell may be searched.

In addition, the UE may average the autocorrelation values estimated from all the OFDM symbols used for the PBCH repetitive transmission and may compare the averaged result with the threshold value "X" to further improve the performance and reliability of determining whether the PBCH repetition is achieved. Here, the threshold value "X" may be implemented so as to be variably changed through software or hardware of the UE, and may be implemented so as to be variably adjusted according to the channel state or path attenuation state of the UE.

When the base station is determined to support the PBCH coverage extension, i.e., when the autocorrelation value is greater than (or equal to) the threshold value "X", the UE may acquire broadcast information through decoding of the received signal in operation 704. As a premise for decoding the received signal, the UE may estimate and compensate for a frequency offset on the basis of autocorrelation calculation. The UE may attempt to decode the signal received in operation 701, assuming that the base station supports the PBCH coverage extension on the basis of the result of determining that the autocorrelation value is greater than the threshold value. Decoding is a process of returning encoded information (or signal) to the state before being encoded, and may perform reversely the encoding procedure. Specifically, the UE may perform descrambling on the PBCH received in the radio frame with a scrambling sequence, may combine the segmented bit strings, and then may attempt to decode the corresponding channel. The UE may acquire broadcast information included in the MIB through decoding. Specifically, the UE may acquire downlink system bandwidth information, PHICH configuration information, and SFN information, which are the broadcast information included in the MIB. The UE may perform communication with the base station using the obtained broadcast information.

Figure 8:
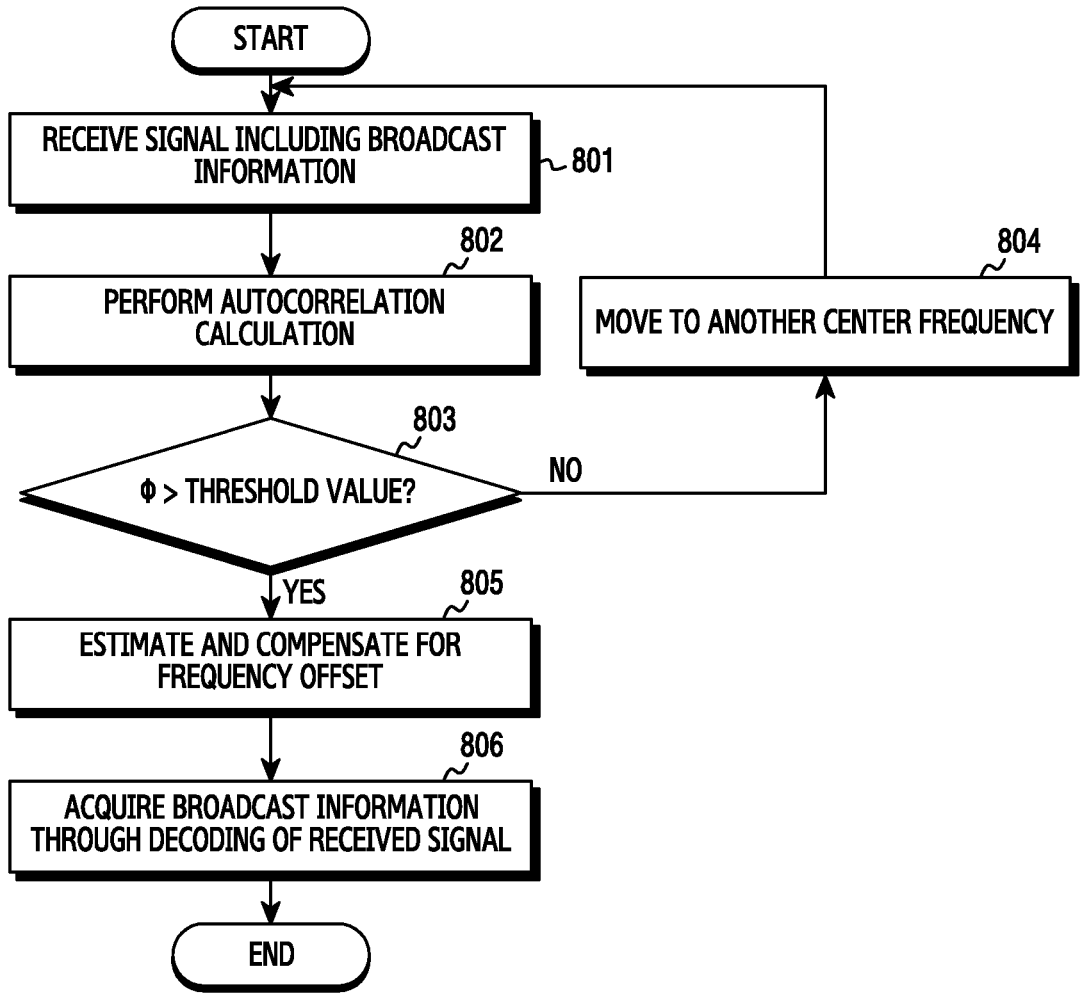
FIG. 8 is a flowchart illustrating a second embodiment in which a terminal according to an embodiment of the present disclosure performs initial connection to a base station through frequency offset compensation on the basis of autocorrelation calculation.

FIG. 8 is a flowchart illustrating a second embodiment in which a UE according to an embodiment of the present disclosure performs initial connection to a base station through frequency offset compensation on the basis of autocorrelation calculation.

Referring to FIG. 8, in operation 801, the UE may receive a signal including broadcast information. The reception of the signal may be performed through the communication unit 510 of FIG. 5. Specifically, the UE may perform synchronization with the base station using PSS/SSS transmitted from the base station in the initial connection to the base station. After the synchronization with the base station is completed, the UE receives an MIB and an SIB transmitted by the base station and acquires broadcast information necessary for communication with the base station in the future.

When operation 801 is completed, the UE proceeds to operation 802, and may perform autocorrelation calculation. The UE may perform autocorrelation calculation assuming that the base station supports PBCH coverage extension. According to one embodiment, the UE may perform autocorrelation calculation in units of OFDM symbols. That is, the UE may perform autocorrelation calculation between an OFDM symbol in which a legacy PBCH is transmitted and an OFDM symbol (determined in advance according to the method proposed in FIG. 4) for transmitting the repeated PBCH. For example, referring to FIG. 4A, since a PBCH transmitted in an OFDM symbol #7 is additionally repeated in an OFDM symbol #4, assuming that the base station supports the PBCH coverage extension, autocorrelation calculation between the OFDM symbols #4 and #7 may be performed. According to another embodiment, the UE may perform autocorrelation calculation in units of subframes. Two subframes in which a PBCH is transmitted in one radio frame may be mapped to the same PBCH and may be repeatedly transmitted. In this case, the UE may perform autocorrelation calculation in units of subframes. For example, in the case of an FDD, when a PBCH transmitted in a subframe #0 and a PBCH transmitted in a subframe #9 are repeated in the same signal and the same pattern, autocorrelation calculation between the subframe #0 and the subframe #9 may be performed.

When an autocorrelation calculation between the OFDM symbols or autocorrelation calculation process between the subframes in which the PBCH is repeated is completed, the UE proceeds to operation 803. In operation 803, the UE may determine whether the autocorrelation value is greater than (or equal to or greater than) a predetermined threshold value "X". The autocorrelation value may be determined, for example, using Equation 2 on the basis of the autocorrelation calculation performed in operation 802. According to one embodiment, when the PBCH is repeated in units of OFDM symbols or in units of subframes, that is, when the base station supports the PBCH coverage extension, the autocorrelation value may be determined to be greater than the threshold "X". In this case, the UE may determine that the base station supports the PBCH coverage extension. According to another embodiment, when the PBCH is not repeated in units of OFDM symbols or in units of subframes, that is, when the base station does not support the PBCH coverage extension, the autocorrelation value may be close to zero and thereby may be determined to be smaller than the threshold value "X". In this case, the UE may determine that the base station does not support the PBCH coverage extension. Also, the UE may average the autocorrelation values estimated from all the OFDM symbols used for the PBCH repetitive transmission and may compare the averaged result with the threshold value "X" to further improve the performance and reliability of determining whether the PBCH repetition is achieved. Here, the threshold value "X" may be implemented so as to be variably changed through software or hardware of the UE, and may be implemented so as to be variably adjusted according to the channel state or path attenuation state of the UE.

When it is determined that the base station does not support the PBCH coverage extension, i.e., when the autocorrelation value is greater than (or equal to) the threshold value "X", the UE may search for another center frequency or another cell in operation 804. That is, the UE may stop the communication with the base station currently receiving the PBCH and attempt to make initial connection to another adjacent base station or to a base station of a different layer in a communication system constituting a hierarchical cell structure. In this case, the UE returns to operation 801 and repeatedly performs the process of receiving the signal including the broadcast information from the base station.

When the base station is determined to support the PBCH coverage extension, i.e., when the autocorrelation value is greater than (or greater than or equal to) the threshold value "X", the UE may estimate and compensate for the frequency offset for the received signal in operation 805. Specifically, the UE may perform frequency offset estimation and compensation through the result of autocorrelation calculation in operation 802 on the basis of the PBCH repetitive pattern. As a result, the UE may estimate the frequency offset existing between the base station and the UE using the PBCH repetitive pattern even without decoding the received signal. Also, the UE may improve the frequency offset estimation performance by averaging the frequency offset values estimated from all the OFDM symbols used for the PBCH repetitive transmission. When the frequency offset is estimated, the UE may compensate for the estimated value to reduce performance degradation that may occur in the channel estimation. According to one embodiment, the frequency offset estimation may be performed using Equation 1 for estimating the frequency offset using the PBCH repetitive pattern.

In operation 806, the UE that has completed frequency offset estimation and compensation may obtain broadcast information through decoding of the received signal. As a premise for decoding the received signal, the UE may estimate and compensate for the frequency offset on the basis of the autocorrelation calculation. The UE may attempt to decode the signal received in operation 801, assuming that the base station supports the PBCH coverage extension on the basis of the result that the autocorrelation value is determined to be greater than the threshold value. The UE may acquire broadcast information included in the MIB through decoding. Specifically, the UE may acquire downlink system bandwidth information, PHICH configuration information, and SFN information, which are the broadcast information included in the MIB. The UE may perform communication with the base station using the obtained broadcast information.

Figure 9:
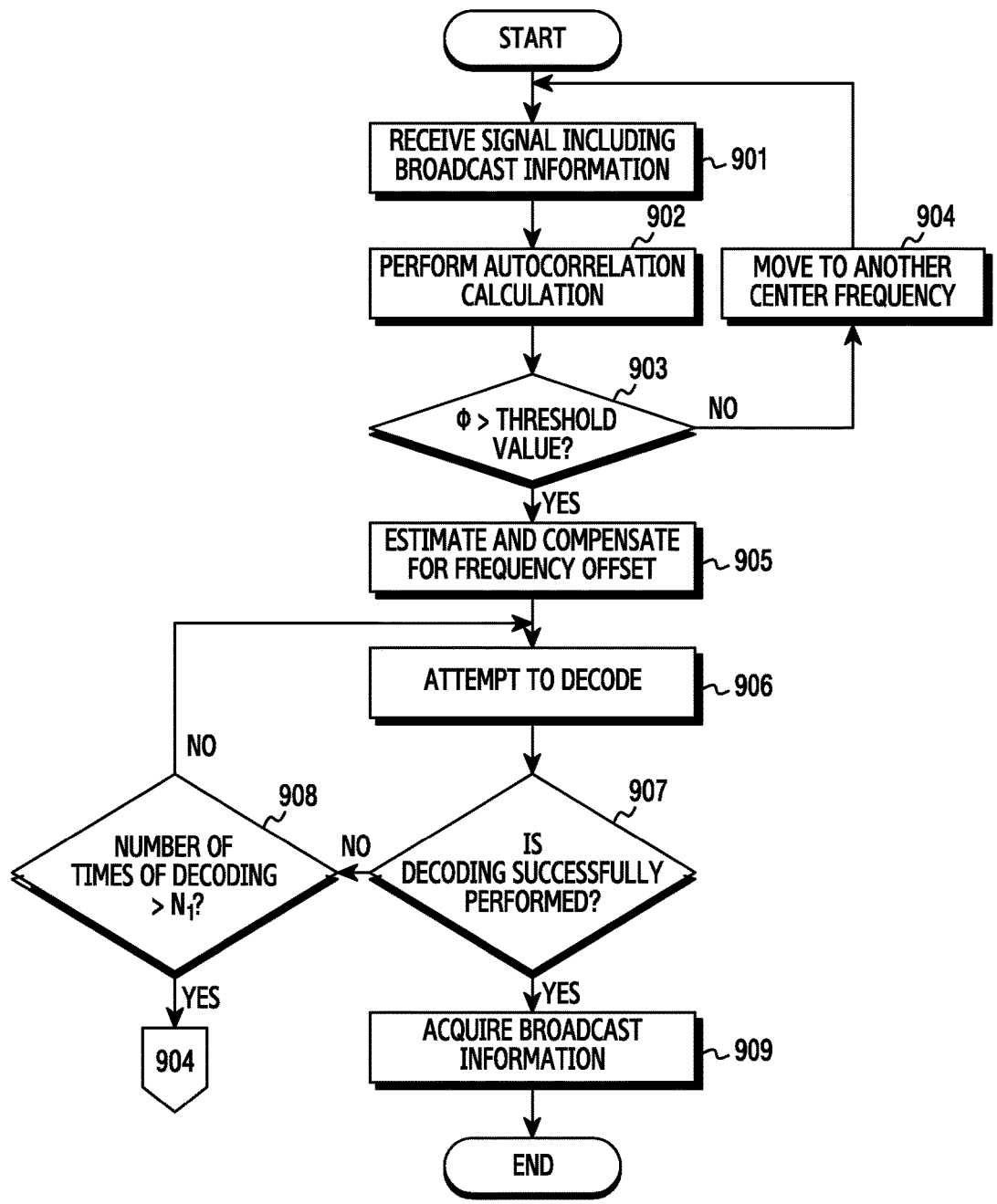
FIG. 9 is a flowchart illustrating a third embodiment in which a terminal according to an embodiment of the present disclosure performs initial connection to a base station in consideration of the number of decoding attempts.

FIG. 9 is a flowchart illustrating a third embodiment in which a UE according to an embodiment of the present disclosure performs initial connection to a base station in consideration of the number of decoding attempts.

Referring to FIG. 9, in operation 901, the UE may receive a signal including broadcast information. The reception of the signal may be performed through the communication unit 510 of FIG. 5. Specifically, the UE may perform synchronization with a base station using PSS/SSS transmitted from the base station in initial connection to the base station. After the synchronization with the base station is completed, the UE receives an MIB and an SIB transmitted by the base station and acquires broadcast information necessary for communication with the base station in the future.

When operation 901 is completed, the UE proceeds to operation 902, and may perform autocorrelation calculation. The UE may perform autocorrelation calculation assuming that the base station supports PBCH coverage extension. According to one embodiment, the UE may perform autocorrelation calculation in units of OFDM symbols. That is, the UE may perform autocorrelation calculation between an OFDM symbol in which a legacy PBCH is transmitted and an OFDM symbol (determined in advance according to the method proposed in FIG. 4) for transmitting the repeated PBCH. For example, referring to FIG. 4A, since a PBCH transmitted in an OFDM symbol #7 is additionally repeated in an OFDM symbol #4, assuming that the base station supports the PBCH coverage extension, autocorrelation calculation may be performed between the OFDM symbols #4 and #7. According to another embodiment, the UE may perform autocorrelation calculation in units of subframes. Two subframes in which a PBCH is transmitted in one radio frame may be mapped to the same PBCH and may be repeatedly transmitted. In this case, the UE may perform autocorrelation calculation in units of subframes. For example, in the case of an FDD, when a PBCH transmitted in a subframe #0 and a PBCH transmitted in a subframe #9 are repeated in the same signal and the same pattern, autocorrelation calculation between the subframe #0 and the subframe #9 may be performed.

When autocorrelation calculation between the OFDM symbols or autocorrelation calculation between the subframes, in which the PBCH is repeated, is completed, the UE proceeds to operation 903. In operation 903, the UE may determine whether the autocorrelation value is greater than (or equal to or greater than) a predetermined threshold value "X". The autocorrelation value may be determined using Equation 2 on the basis of the autocorrelation calculation performed in operation 902. According to one embodiment, when the PBCH is repeated in units of OFDM symbols or in units of subframes, that is, when the base station supports the PBCH coverage extension, the autocorrelation value may be determined to be greater than the threshold "X". In this case, the UE may determine that the base station supports the PBCH coverage extension. According to another embodiment, when the PBCH is not repeated in units of OFDM symbols or in units of subframes, that is, when the base station does not support the PBCH coverage extension, the autocorrelation value may be close to zero and thereby may be determined to be smaller than the threshold value "X". In this case, the UE may determine that the base station does not support the PBCH coverage extension. Also, the UE may average the autocorrelation values estimated from all the OFDM symbols used for the PBCH repetitive transmission and may compare the averaged result with the threshold value "X" to further improve the performance and reliability of determining whether the PBCH repetition is achieved. Here, the threshold value "X" may be implemented so as to be variably changed through software or hardware of the UE, and may be implemented so as to be variably adjusted according to the channel state or path attenuation state of the UE.

When it is determined that the base station does not support the PBCH coverage extension, i.e., when the autocorrelation value is smaller than the threshold value "X", the UE may search for another center frequency or another cell in operation 904. That is, the UE may stop the communication with the base station currently receiving the PBCH and attempt to make initial connection to another adjacent base station or to a base station of a different layer in a communication system constituting a hierarchical cell structure. In this case, the UE returns to operation 901 and repeatedly performs the process of receiving the signal including the broadcast information from the base station.

When the base station is determined to support the PBCH coverage extension, i.e., when the autocorrelation value is greater than (or greater than or equal to) the threshold value "X", the UE may estimate and compensate for the frequency offset for the received signal in operation 905. Specifically, the UE may perform frequency offset estimation and compensation through the result of autocorrelation calculation in operation 902 on the basis of the PBCH repetitive pattern. As a result, the UE may estimate the frequency offset existing between the base station and the UE using the PBCH repetitive pattern even without decoding the received signal. Also, the UE may improve the frequency offset estimation performance by averaging the frequency offset values estimated from all the OFDM symbols used for the PBCH repetitive transmission. When the frequency offset is estimated, the UE may compensate for the estimated value to reduce performance degradation that may occur in the channel estimation. According to one embodiment, the frequency offset estimation may be performed using Equation 1 for estimating the frequency offset using the PBCH repetitive pattern.

In operation 906, the UE that has completed frequency offset estimation and compensation may attempt to decode the received signal. The UE may attempt to decode the signal received in operation 901, assuming that the base station supports the PBCH coverage extension on the basis of the result of determining that the autocorrelation value is greater than the threshold value. Decoding is a process of returning encoded information (or signal) to the state before being encoded, and may reversely perform the encoding procedure. Specifically, the UE may perform descrambling on the PBCH received in the radio frame with a scrambling sequence, may combine the segmented bit strings, and then may attempt to decode the corresponding channel.

Next, in operation 907, the UE may determine whether decoding is successfully performed. The UE may determine whether MIB decoding is successfully performed through the CRC of the MIB. Specifically, the UE may determine whether an error is included in the MIB acquired through the decoding result on the received PBCH. For example, referring to FIG. 2, the UE may determine CRC bits for decoded bit strings, that is, the MIB 202 in the same manner as the base station. That is, when a 24-bit MIB is divided by a predefined 16th order generator polynomial, the UE may determine the CRC bits by performing a logical exclusive OR operation on a mask bit sequence, which is determined according to the number of antenna ports used by the base station for the transmission of the PBCH in the remaining bit strings. The UE may compare the determined CRC bits with the received CRC bits. When the two CRC bits are the same, the UE may determine that there is no error in the MIB, and otherwise, the UE may determine that there is an error in the MIB.

When it is determined that the MIB has been successfully decoded, the UE may acquire the broadcast information included in the MIB in operation 909. Specifically, the UE may acquire downlink system bandwidth information, PHICH configuration information, and SFN information, which are the broadcast information included in the MIB.

The UE may perform communication with the base station using the obtained broadcast information.

On the contrary, when it is determined that the MIB has not been successfully decoded in operation 907, the UE proceeds to operation 908. In operation 908, the UE may compare the number of PBCH decoding attempts performed in the corresponding cell or the corresponding center frequency with a predetermined $N_1$. Here, $N_1$ is an arbitrary integer greater than 1 preset in the UE. For example, $N_1$ may be an integer of 3. According to one embodiment, it can be assumed that the number of times of PBCH decoding is greater than $N_1$. In this case, the UE may determine that a diversity gain for performing the PBCH decoding in the corresponding center frequency or the corresponding cell is insufficient. Accordingly, the UE proceeds to operation 904 and moves to another center frequency or another cell. When it is determined in operation 607 that the number of times of PBCH decoding is less than $N_1$, the UE proceeds to operation 906 again and performs PBCH decoding in the next PBCH reception interval. In operation 908, $N_1$ may be implemented so as to be variably changed through software or hardware in the UE, and may be implemented so as to be variably adjusted according to the channel state or path attenuation state of the UE.

Figure 10:
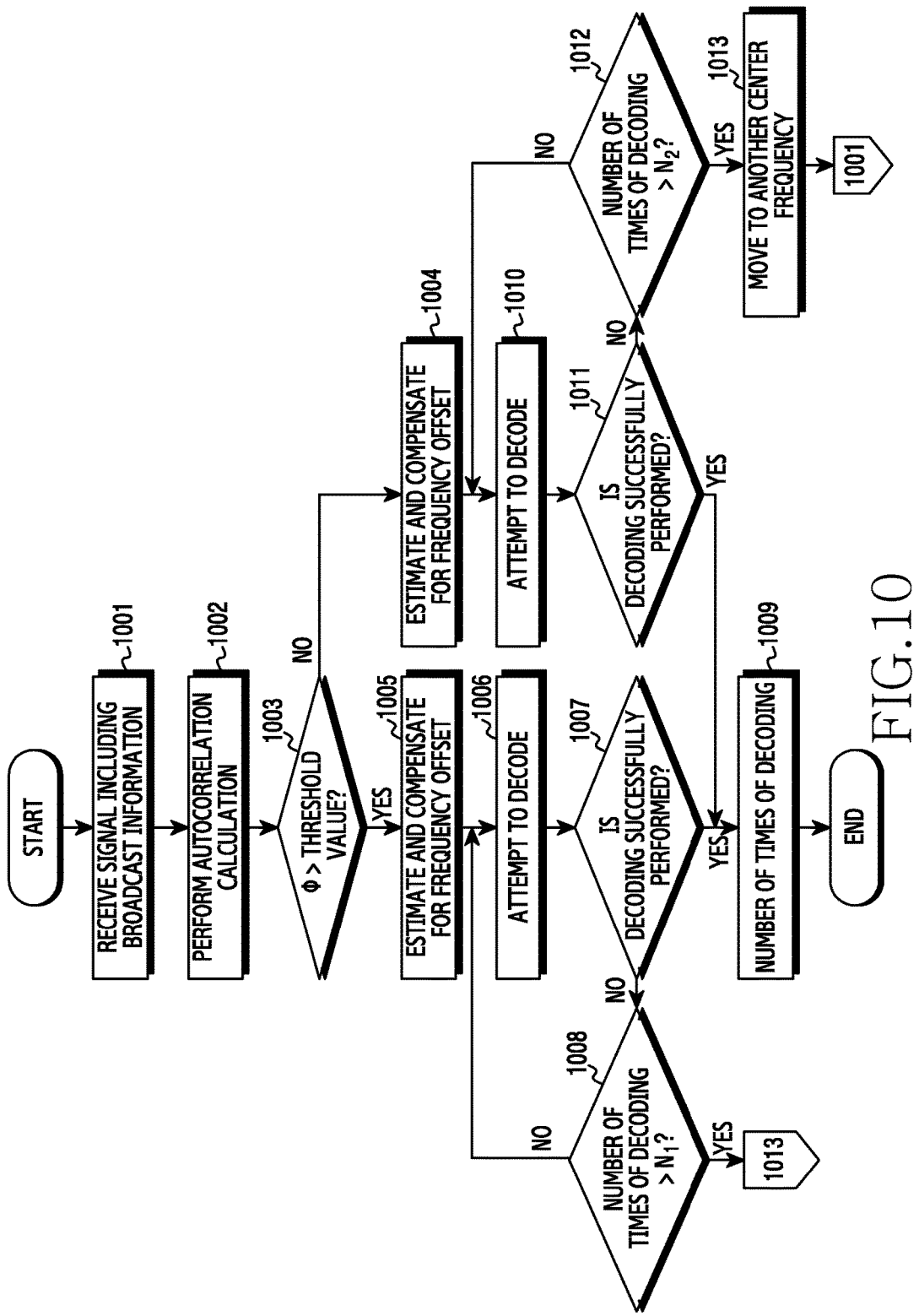
FIG. 10 is a flowchart illustrating a fourth embodiment in which a terminal according to an embodiment of the present disclosure performs initial connection to a base station in consideration of a decoding attempt frequency.

FIG. 10 is a flowchart illustrating a fourth embodiment in which a UE according to an embodiment of the present disclosure performs initial connection to a base station in consideration of a decoding attempt frequency.

Referring to FIG. 10, in operation 1001, a UE may receive a signal including broadcast information. The reception of the signal may be performed through the communication unit 510 of FIG. 5. Specifically, the UE may perform synchronization with a base station using PSS/SSS transmitted by the base station in initial connection to the base station. After the synchronization with the base station is completed, the UE receives an MIB and an SIB transmitted by the base station and acquires the broadcast information necessary for communication with the base station in the future.

When operation 1001 is completed, the UE proceeds to operation 1002, and may perform autocorrelation calculation. The UE may perform autocorrelation calculation assuming that the base station supports PBCH coverage extension. According to one embodiment, the UE may perform autocorrelation calculation in units of OFDM symbols. That is, the UE may perform autocorrelation calculation between an OFDM symbol in which a legacy PBCH is transmitted and an OFDM symbol (determined in advance according to the method proposed in FIG. 4) for transmitting the repeated PBCH. For example, referring to FIG. 4A, since a PBCH transmitted in an OFDM symbol #7 is additionally repeated in an OFDM symbol #4, assuming that the base station supports the PBCH coverage extension, autocorrelation calculation may be performed between the OFDM symbols #4 and #7. According to another embodiment, the UE may perform autocorrelation calculation in units of subframes. Two subframes in which a PBCH is transmitted in one radio frame may be mapped to the same PBCH and may be repeatedly transmitted. In this case, the UE may perform autocorrelation calculation in units of subframes. For example, in the case of an FDD, when a PBCH transmitted in a subframe #0 and a PBCH transmitted in a subframe #9 are repeated in the same signal and the same pattern, autocorrelation calculation between the subframe #0 and the subframe #9 may be performed.

When autocorrelation calculation between the OFDM symbols or autocorrelation calculation between the subframes, in which the PBCH is repeated, is completed, the UE proceeds to operation 1003. In operation 1003, the UE may determine whether the autocorrelation value is greater than (or equal to or greater than) a predetermined threshold value "X". The autocorrelation value may be determined using Equation 2 on the basis of the autocorrelation calculation performed in operation 1002. According to one embodiment, when the PBCH is repeated in units of OFDM symbols or in units of subframes, that is, when the base station supports the PBCH coverage extension, the autocorrelation value may be determined to be greater than the threshold "X". In this case, the UE may determine that the base station supports the PBCH coverage extension. According to another embodiment, when the PBCH is not repeated in units of OFDM symbols or in units of subframes, that is, when the base station does not support the PBCH coverage extension, the autocorrelation value may be close to zero, and thereby may be determined to be smaller than the threshold value "X". In this case, the UE may determine that the base station does not support the PBCH coverage extension. Also, the UE may average the autocorrelation values estimated from all the OFDM symbols used for the PBCH repetitive transmission and may compare the averaged result with the threshold value "X" to further improve the performance and reliability of determining whether the PBCH repetition is achieved. Here, the threshold value "X" may be implemented so as to be variably changed through software or hardware of the UE, and may be implemented so as to be variably adjusted according to the channel state or path attenuation state of the UE.

When it is determined that the autocorrelation value is smaller than the threshold value "X", the UE proceeds to operation 1004, and when it is determined that the autocorrelation value is equal to or greater than the threshold value "X", the UE proceeds to operation 1005.

According to one embodiment, when the base station is determined to support the PBCH coverage extension, i.e., when the autocorrelation value is greater than (or greater than or equal to) the threshold value "X", the UE may estimate and compensate for a frequency offset with respect to the received signal in operation 1005. Specifically, the UE may perform frequency offset estimation and compensation through the result of autocorrelation calculation in operation 902 on the basis of the PBCH repetitive pattern. As a result, the UE may estimate the frequency offset existing between the base station and the UE using the PBCH repetitive pattern without decoding the received signal. Also, the UE may improve the frequency offset estimation performance by averaging the frequency offset values estimated from all the OFDM symbols used for the PBCH repetitive transmission. When the frequency offset is estimated, the UE may compensate for the estimated value to reduce performance degradation that may occur in the channel estimation. According to one embodiment, the frequency offset estimation may be performed using Equation 1 for estimating the frequency offset using the PBCH repetitive pattern.

After the frequency offset estimation and compensation is completed, the UE may attempt to decode the received signal in operation 1006. The UE may attempt to decode the signal received in operation 1001, assuming that the base station supports the PBCH coverage extension on the basis of the result that the autocorrelation value is determined to be greater than the threshold value. Decoding is a process of returning encoded information (or signal) to the state before being encoded, and may reversely perform the encoding procedure. Specifically, the UE may perform descrambling on the PBCH received in the radio frame with a scrambling sequence, may combine the segmented bit strings, and then may attempt to decode the corresponding channel.

Next, in operation 1007, the UE may determine whether decoding is successfully performed. The UE may determine whether MIB decoding is successfully performed through the CRC of the MIB. Specifically, the UE may determine whether an error is included in the MIB acquired through the decoding result on the received PBCH. For example, referring to FIG. 2, the UE may determine CRC bits for decoded bit strings, that is, the MIB 202 in the same manner as the base station. That is, when a 24-bit MIB is divided by a predefined 16th order generator polynomial, the UE may determine the CRC bits by performing a logical exclusive OR operation on a mask bit sequence, which is determined according to the number of antenna ports used by the base station for the transmission of the PBCH in the remaining bit strings. The UE may compare the determined CRC bits with the received CRC bits. When the two CRC bits are the same, the UE may determine that there is no error in the MIB, and otherwise, the UE may determine that there is an error in the MIB.

When it is determined that the MIB has been successfully decoded, the UE may acquire the broadcast information included in the MIB in operation 1009. Specifically, the UE may acquire downlink system bandwidth information, PHICH configuration information, and SFN information, which are the broadcast information included in the MIB. The UE may perform communication with the base station using the obtained broadcast information.

On the contrary, when it is determined that the MIB has not been successfully decoded in operation 1007, the UE proceeds to operation 1008. In operation 1008, the UE may compare the number of PBCH decoding attempts performed in the corresponding cell or the corresponding center frequency with a predetermined $N_1$. Here, $N_1$ is an arbitrary integer greater than 1 preset in the UE. For example, $N_1$ may be an integer of 3. According to one embodiment, it can be assumed that the number of times of PBCH decoding is greater than $N_1$. In this case, the UE may determine that a diversity gain for performing the PBCH decoding in the corresponding center frequency or the corresponding cell is insufficient. Accordingly, the UE proceeds to operation 1013 and moves to another center frequency or another cell. When it is determined in operation 1008 that the number of times of PBCH decoding is less than $N_1$, the UE proceeds to operation 1006 again and performs PBCH decoding in the next PBCH reception interval. In operation 1008, $N_1$ may be implemented so as to be variably changed through software or hardware in the UE, and may be implemented so as to be variably adjusted according to the channel state or path attenuation state of the UE.

According to another embodiment, when it is determined in operation 1003 that the autocorrelation value is smaller than the threshold value "X", the UE may proceeds to operation 1004. The UE is used to decode the received signal, assuming that the base station supports the PBCH coverage extension, even if the autocorrelation value is determined to be less than the threshold value. This is obtained by considering the case where an error may occur in any one of a process of determining the autocorrelation value, a process of setting the threshold value "X", and a process of comparing the autocorrelation value with the threshold value "X". In addition, even when the base station does not support the PBCH coverage extension, it is considered that the UE can successfully decode the received signal according to the channel state. Accordingly, the UE may perform frequency offset estimation and compensation on the received signal in operation 1004. Specifically, the UE may perform frequency offset estimation and compensation on the basis of the autocorrelation calculation in operation 1002. The frequency offset estimation may be performed, for example, using Equation 1. However, as described above, in operation 1003, the reliability of the frequency offset estimation result may be lowered as long as the autocorrelation value is determined to be smaller than the threshold value "X". As a result, the probability of occurrence of an error in the frequency offset compensation process using the offset estimation result may become higher.

After the frequency offset estimation and compensation is completed, the UE may attempt to decode the received signal in operation 1010. The UE may attempt to decode the signal received in operation 1001, assuming that the base station supports the PBCH coverage extension, even if the autocorrelation value is determined to be smaller than the threshold value "X".

Next, the UE proceeds to operation 1010 and determines whether decoding is successfully performed. The UE may determine whether the MIB decoding is successfully performed through the CRC of the MIB. Specifically, the UE determines a CRC bit in the same manner as the base station, and determines whether an error is included in the MIB by determining whether the determined CRC bit is identical to the received CRC bit. When an error is included in the MIB according to an embodiment, that is, when the CRC bits are not the same, it is determined that the decoding has failed and the UE proceeds to operation 1012. According to another embodiment, when an error is not included in the MIB, that is, when the CRC bits are the same, it is determined that decoding has been successfully performed and the UE proceeds to operation 1009.

According to one embodiment, when it is determined that the MIB has been successfully decoded, the UE may acquire the broadcast information included in the MIB in operation 1009. Specifically, the UE may acquire downlink system bandwidth information, PHICH configuration information, and SFN information, which are the broadcast information included in the MIB. The UE may perform communication with the base station using the obtained broadcast information.

According to another embodiment, when it is determined that the MIB has not been successfully decoded, the UE proceeds to operation 1012. In operation 1012, the UE may compare the number of PBCH decoding attempts performed in the corresponding cell or the corresponding center frequency with a predetermined $N_2$. Here, $N_2$ is an arbitrary integer greater than 1 preset in the UE. For example, $N_2$ may be an integer of 4. According to one embodiment, it can be assumed that the number of times of PBCH decoding is greater than $N_1$. In this case, the UE may determine that a diversity gain for performing the PBCH decoding in the corresponding center frequency or the corresponding cell is insufficient. Accordingly, the UE proceeds to operation 1013 and moves to another center frequency or another cell. When it is determined in operation 1012 that the number of times of PBCH decoding is less than $N_2$, the UE proceeds to operation 1010 again and performs PBCH decoding in the next PBCH reception interval. In operation 1012, $N_2$ may be implemented so as to be variably changed through software or hardware in the UE, and may be implemented so as to be variably adjusted according to the channel state or path attenuation state of the UE. In addition, in operation 1003, considering that the autocorrelation value is determined to be smaller than the threshold value "X", $N_2$ may be an integer smaller than $N_1$ in operation 1008.

Figure 11:
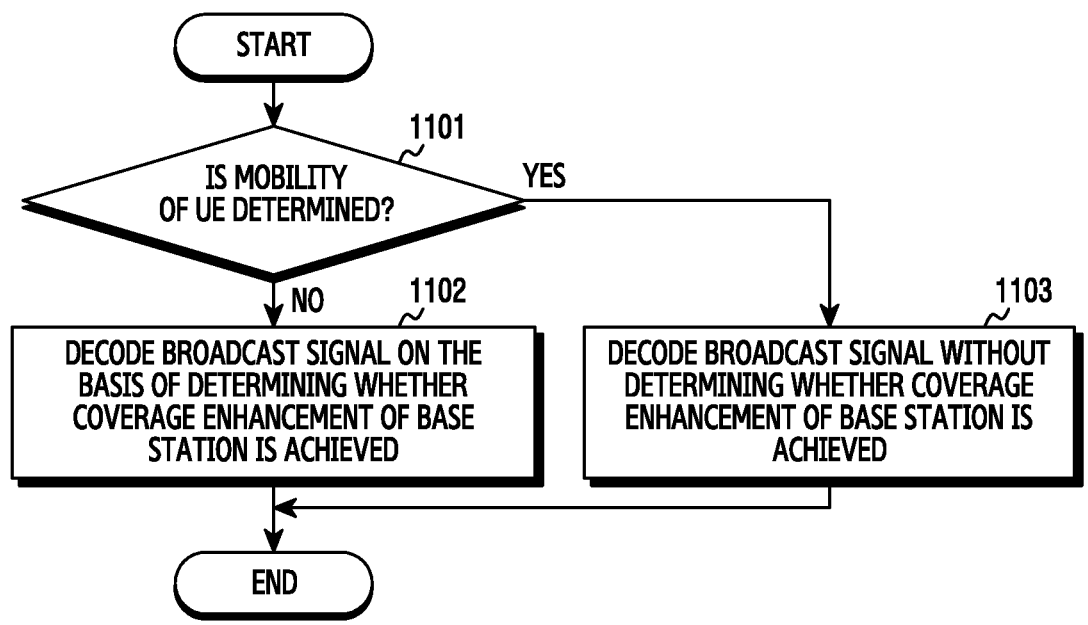
FIG. 11 is a flowchart illustrating a fifth embodiment in which a terminal according to an embodiment of the present disclosure performs initial connection to a base station on the basis of determination of mobility.

FIG. 11 is a flowchart illustrating a fifth embodiment in which a terminal according to an embodiment of the present disclosure performs initial connection to a base station on the basis of determination of mobility.

In operation 1101, a UE may determine whether the UE is currently in a stationary state or moving. Specifically, the UE may determine whether the UE is currently in the stationary state or moving on the basis of received power or an autocorrelation value measured in a PSS or an SSS. The UE may measure the received power or determine the autocorrelation value at the PSS or the SSS periodically transmitted every frame. The UE compares the received power or the autocorrelation value, which is measured in or determined in the PSS or the SSS transmitted from a specific frame, with received power or an autocorrelation value, which is measured in an PSS or an SSS transmitted from another frame, and may determine a difference value (or variation) therebetween, variance, standard deviation, and the like. The UE may determine whether the UE is currently moving by comparing the determined difference value, variance, standard deviation, etc., with a predetermined threshold value "Z". According to one embodiment, a case in which the received power or the autocorrelation value which is measured in or determined in the PSS or the SSS has a change larger than the threshold value "Z" according to the frame may be assumed. In this case, it may be determined that the UE is currently moving. On the contrary, according to another embodiment, a case in which the received power or the autocorrelation value which is measured in or determined in the PSS or the SSS has a change smaller than the threshold value "Z" according to the frame may be assumed. That is, when the measured received power or the determined autocorrelation value is constant with little change according to the frame, the UE may be determined to be in the stationary state. Here, a reference change amount of the received power or autocorrelation value for determining the mobility of the UE, that is, the threshold value "Z" may be determined by the UE itself or may be set to the UE from the outside. In addition, when a large number of PSSs or SSSs is required to be accumulated in a cell search process using the PSS or the SSS, the UE may determine that the UE is in the stationary state. Otherwise, the UE may assume a movement. Also, in this case, the cumulative number of reference PSSs or SSSs used for determining the mobility of the UE may be determined by the UE itself or may be set to the UE from the outside.

According to one embodiment, when it is determined that the UE is currently in the stationary state, the UE proceeds to operation 1102. In operation 1102, the UE obtains broadcast information from the base station through the repetition of the operations as shown in the flowcharts of FIGS. 7 to 11 to thereby achieve initial connection. Specifically, the UE may receive the signal including the broadcast information from the base station and may perform autocorrelation calculation on the received signal. The UE compares the autocorrelation value with the threshold value "X" on the basis of the autocorrelation result, and may determine whether the base station supports PBCH coverage extension. In addition, the UE may perform frequency offset estimation and compensation on the received signal on the basis of the result of the autocorrelation calculation. Thereafter, the UE may attempt to decode the received signal and may acquire the broadcast information through a decoding attempt within a threshold number of times. That is, the UE may acquire downlink system bandwidth information, PHICH configuration information, and SFN information, which are the broadcast information included in the MIB. Next, the UE may perform communication with the base station using the acquired broadcast information.

According to another embodiment, on the contrary, when the UE is determined to be currently moving, the UE proceeds to operation 1103. In operation 1103, the UE performs decoding on the received signal without determining whether the communication coverage extension of the base station is achieved. That is, the UE performs decoding on the received signal without determining whether the base station supports PBCH coverage extension through autocorrelation calculation on the received signal and comparison between the threshold value with the autocorrelation value.

In this embodiment of the present disclosure, the communication coverage enhancement is required because the UE is present in a deep shadow area such as a basement of a building. However, it cannot be known whether the base station supports the coverage extension before the broadcast information is successfully received, and therefore the ineffective operation of the UE can be eliminated. Assuming that the base station repeatedly transmits the broadcast information, the UE determines whether the broadcast information is repeatedly transmitted by calculating autocorrelation. Through this, when the base station does not support the coverage extension mode in the current center frequency or the current cell, the UE may rapidly move to another cell to reduce an initial connection delay time to the base station, and at the same time, the power consumption may be reduced to increase the battery usage time.

Although a new embodiment of the present disclosure that is required according to the communication coverage enhancement of the low-cost UE has been described, the embodiments of the present disclosure are not limited to the low-cost UE but may be applied to a general LTE UE that requires the communication coverage enhancement without modification of the described contents. In addition, in this disclosure, in order to describe the operation of the low-cost UE requiring the communication coverage enhancement, PDCCH, PDSCH, PUCCH, PUSCH, etc., which refer to the physical channel of the existing LTE system, are used as are. However, even when the physical channel for the low-cost UE is newly defined, the embodiment of the present disclosure may be used without modification thereof in the case in which the purpose is the same.

Methods according to claims of the present disclosure and/or embodiments described in the specification of the present disclosure may be implemented as hardware, software, or combinational type of the hardware and the software.

When the method is implemented by the software, a computer-readable storage medium for storing one or more programs (software modules) may be provided. The one or more programs stored in the computer-readable storage medium may be executed by one or more processors in an electronic device. The one or more programs include instructions for allowing an electronic device to execute the methods according to the claims of the present disclosure and/or the embodiments described in the specification of the present disclosure.

These programs (software module, software) may be stored in a Random Access Memory (RAM), a non-volatile memory including a flash memory, a Read Only Memory (ROM), an Electrically Erasable Programmable ROM (EEPROM), a magnetic disc storage device, a Compact Disc-ROM (CD-ROM), a Digital Versatile Disc (DVD) or an optical storage device of a different type, and a magnetic cassette. Or, the programs may be stored in a memory configured by combination of some or all of them. Also, the configured memory may include a plurality of memories.

Also, the programs can be stored to an attachable storage device accessible via the communication network such as Internet, Intranet, Local Area Network (LAN), Wide LAN (WLAN), or Storage Area Network (SAN), or a communication network combining the networks. The storage device can access a device performing the embodiment of the present disclosure through an external port. A separate storage device in the communication network can access the device performing the embodiment of the present disclosure.

In the above-mentioned specific embodiments, elements included in the disclosure have been expressed singular or plural in accordance with the specific embodiments shown. It should be understood, however, that the singular or plural representations are selected appropriately according to the situations presented for the convenience of description and that the above-described embodiments are not limited to the singular or plural constituent elements, while they may be composed of a plurality of elements even if they are represented by singular values, or while they may be composed of singular values even if they are represented by a plurality of elements.

While the disclosure has been shown and described with reference to certain preferred embodiments thereof, it will be understood by those skilled in the art that various changes and modifications may be made without departing from the spirit and scope of the disclosure as defined by the appended claims. Therefore, the scope of the present disclosure should not be construed as being limited to the embodiments described, but should be determined by the equivalent scope of the appended claims, as well as the appended claims.

The invention claimed is:

1. A method for operating a terminal in a wireless communication system, the method comprising:
   receiving, from a base station, a signal including broadcast information;
   determining an autocorrelation value using a repetitive pattern of the signal;
   determining whether the base station supports coverage enhancement based on the autocorrelation value; and
   acquiring the broadcast information from the received signal based on the coverage enhancement being supported by the base station.

2. The method of claim 1, wherein the determining whether the base station supports coverage enhancement comprises comparing the autocorrelation value with a predetermined threshold value to determine whether the base station supports coverage enhancement.

3. The method of claim 2, further comprising:
   determining that the base station supports the coverage enhancement if an absolute value of the autocorrelation value is greater than or equal to the predetermined threshold value; and
   determining that the base station does not support the coverage enhancement if the absolute value of the autocorrelation value is smaller than the predetermined threshold value.

4. The method of claim 1, further comprising:
   estimating and compensating for a frequency offset based on the autocorrelation value.

5. The method of claim 1, wherein the determining the broadcast information via the received signal comprises:
   determining whether an error is included in a result of decoding, and
   comparing a number of decoding attempts with a predetermined threshold value if it is determined that the error is included in the result of the decoding.

6. The method of claim 5, further comprising:
   decoding in a reception interval of a next signal if the number of decoding attempts is smaller than the predetermined threshold value; and
   searching for another center frequency if the number of decoding attempts is greater than or equal to the predetermined threshold value.

7. The method of claim 1, further comprising:
   searching for another center frequency without decoding the received signal if the base station does not support the coverage enhancement.

8. The method of claim 1, wherein the determining the autocorrelation value comprises:
   determining the autocorrelation value in units of symbols of the signal or in units of subframes thereof.

9. The method of claim 1, further comprising:
   combining and decoding signals repeatedly received for a continuous time.

10. The method of claim 1, further comprising:
    determining whether the terminal is moving based on the autocorrelation value; and
    decoding the signal without determining whether the base station supports the coverage enhancement if the terminal is determined to be moving.

11. A terminal in a wireless communication system, the terminal comprising:
    a transceiver configured to receive, from a base station, a signal including broadcast information; and
    at least one processor configured to:
    determine an autocorrelation value using a repetitive pattern of the signal,
    determine whether the base station supports coverage enhancement based on the autocorrelation value, and
    acquire the broadcast information from the received signal based on the coverage enhancement being supported by the base station.

12. The terminal of claim 11, wherein the at least one processor is further configured to determine the autocorrelation value in units of symbols of the signal or in units of subframes thereof.

13. The terminal of claim 11, wherein the at least one processor is further configured to determine whether the base station supports the coverage enhancement by comparing the autocorrelation value with a predetermined threshold value.

14. The terminal of claim 13, wherein the at least one processor is further configured to:
    determine that the base station supports the coverage enhancement if an absolute value of the autocorrelation value is greater than or equal to the predetermined threshold value, and
    determine that the base station does not support the coverage enhancement if the absolute value of the autocorrelation value is smaller than the predetermined threshold value.

15. The terminal of claim 11, wherein the at least one processor is further configured to estimate and compensate for a frequency offset based on the autocorrelation value.

16. The terminal of claim 11, wherein the at least one processor is further configured to combine and decode signals repeatedly received for a continuous time.

17. The terminal of claim 11, wherein the at least one processor is further configured to:

determine whether an error is included in a result of decoding, and compare a number of decoding attempts with a predetermined threshold value if it is determined that the error is included in the result of the decoding.

18. The terminal of claim 17, wherein the at least one processor is further configured to:

perform decoding in a reception interval of a next signal if the number of decoding attempts is smaller than the predetermined threshold value, and search for another center frequency if the number of decoding attempts is greater than or equal to the predetermined threshold value.

19. The terminal of claim 11, wherein the at least one processor is further configured to:

determine whether the terminal is moving based on the autocorrelation value, and perform decoding of the signal without determining whether the base station supports the coverage enhancement if the terminal is determined to be moving.

20. The terminal of claim 11, wherein the at least one processor is further configured to search for another center frequency without decoding the received signal if the base station does not support the coverage enhancement.

* * * * *